(12) United States Patent
Harris et al.

(10) Patent No.: US 11,254,607 B2
(45) Date of Patent: Feb. 22, 2022

(54) COATED GLASS-BASED ARTICLES WITH ENGINEERED STRESS PROFILES AND METHODS OF MANUFACTURE

(71) Applicant: CORNING INCORPORATED, Corning, NY (US)

(72) Inventors: Jason Thomas Harris, Horseheads, NY (US); Vijay Subramanian, Painted Post, NY (US)

(73) Assignee: Corning Incorporated, Corning, NY (US)

(*) Notice: Subject to any disclaimer, the term of this patent is extended or adjusted under 35 U.S.C. 154(b) by 186 days.

(21) Appl. No.: 16/478,700

(22) PCT Filed: Jan. 16, 2018

(86) PCT No.: PCT/US2018/013779
§ 371 (c)(1),
(2) Date: Jul. 17, 2019

(87) PCT Pub. No.: WO2018/136388
PCT Pub. Date: Jul. 26, 2018

(65) Prior Publication Data
US 2019/0367408 A1 Dec. 5, 2019

Related U.S. Application Data

(60) Provisional application No. 62/447,562, filed on Jan. 18, 2017.

(51) Int. Cl.
*C03C 21/00* (2006.01)
*C03C 17/00* (2006.01)
*B32B 17/06* (2006.01)

(52) U.S. Cl.
CPC .......... *C03C 17/006* (2013.01); *B32B 17/06* (2013.01); *C03C 21/002* (2013.01);
(Continued)

(58) Field of Classification Search
CPC ... C03C 21/002; C03C 2217/78; B32B 17/06; B32B 2307/584
(Continued)

(56) References Cited

U.S. PATENT DOCUMENTS 8,312,739 B2 11/2012 Lee et al.
8,561,429 B2 10/2013 Allan et al.
(Continued)

FOREIGN PATENT DOCUMENTS

CN 103338926 A 10/2013
CN 103702952 A 4/2014
(Continued)

OTHER PUBLICATIONS

European Patent Application No. 18711722.1 Office Action dated Mar. 11, 2021; 4 Pages; European Patent Office.
(Continued)

*Primary Examiner* — Lauren R Colgan
(74) *Attorney, Agent, or Firm* — Jeffrey A. Schmidt

(57) ABSTRACT

Coated glass-based articles and methods of manufacture disclosed. An article comprises a chemically strengthened glass-based core substrate having a first surface and a second surface, a chemically strengthened glass-based first cladding substrate having a third surface directly bonded to the first surface to provide a first core-cladding interface and a chemically strengthened glass-based second cladding substrate having a fourth surface directly bonded to the second surface to provide a second core-cladding interface, wherein the core substrate is bonded to the first cladding substrate and the second cladding substrate, and there is a coating on the first cladding substrate.

15 Claims, 27 Drawing Sheets

(52) U.S. Cl.
CPC ... *B32B 2307/536* (2013.01); *B32B 2307/546* (2013.01); *B32B 2307/558* (2013.01); *B32B 2307/584* (2013.01); *B32B 2419/00* (2013.01); *B32B 2457/20* (2013.01); *B32B 2605/00* (2013.01); *C03C 2217/78* (2013.01)

(58) Field of Classification Search
USPC .................................. 428/410, 428, 432
See application file for complete search history.

(56) References Cited

U.S. PATENT DOCUMENTS

| | | | |
|---|---|---|---|
| 8,854,623 | B2 | 10/2014 | Fontaine et al. |
| 9,156,724 | B2 | 10/2015 | Gross |
| 9,193,625 | B2 | 11/2015 | Bookbinder et al. |
| 9,522,836 | B2 | 12/2016 | Gulati et al. |
| 2013/0224492 | A1* | 8/2013 | Bookbinder .......... C03C 23/007 428/410 |
| 2014/0138420 | A1 | 5/2014 | Peng et al. |
| 2015/0030834 | A1* | 1/2015 | Morey .................... G01N 3/30 428/220 |
| 2015/0079398 | A1* | 3/2015 | Amin ................. C03C 17/3435 428/408 |
| 2015/0147574 | A1* | 5/2015 | Allan .................... C03C 21/002 428/410 |
| 2015/0239775 | A1 | 8/2015 | Amin et al. |
| 2016/0114564 | A1 | 4/2016 | Dejneka et al. |
| 2017/0297308 | A1* | 10/2017 | Golyatin ................ B32B 17/06 |
| 2017/0355640 | A1* | 12/2017 | Oram ..................... C03C 3/097 |
| 2018/0105461 | A1* | 4/2018 | Schneider ............... C03C 17/30 |

FOREIGN PATENT DOCUMENTS

| | | |
|---|---|---|
| CN | 105452184 A | 3/2016 |
| CN | 105980323 A | 9/2016 |
| JP | 2014-521582 A | 8/2014 |
| JP | 2015-511573 A | 4/2015 |
| JP | 2016-177992 A | 10/2016 |
| JP | 2016-533316 A | 10/2016 |
| JP | 2016-538224 A | 12/2016 |
| JP | 2016-540720 A | 12/2016 |
| TW | 201623165 A | 7/2016 |
| WO | 2012/074983 A1 | 6/2012 |
| WO | 2013/016157 A1 | 1/2013 |
| WO | 2015/127483 A2 | 8/2015 |
| WO | 2016/037787 A1 | 3/2016 |
| WO | 2016/057590 A1 | 4/2016 |
| WO | 2017030736 A1 | 2/2017 |
| WO | 2018136384 A1 | 7/2018 |
| WO | 2018144554 A1 | 8/2019 |

OTHER PUBLICATIONS

International Search Report and Written Opinion of the International Searching Authority; PCT/US2018/013779; dated Jun. 26, 2018; 19 Pages; European Patent Office.

Chinese Patent Application No. 201880018853.4, Office Action dated May 26, 2021, 21 pages (English Translation Only), Chinese Patent Office.

Taiwanese Patent Application No. 107101821, Office Action dated May 14, 2021, 3 pages (English Translation Only) Taiwanese Patent Office.

Japanese Patent Application No. 2019-559001, Office Action dated Nov. 24, 2021, 8 pages (4 pages of English Translation and 4 pages of Original Document), Japanese Patent Office.

* cited by examiner

COATED GLASS-BASED ARTICLES WITH ENGINEERED STRESS PROFILES AND METHODS OF MANUFACTURE

CROSS-REFERENCE TO RELATED APPLICATIONS

This application is a national stage entry of International Patent Application Serial No. PCT/US2018/013779, filed on Jan. 16, 2018, which in turn, claims the benefit of priority under 35 U.S.C. § 119 of U.S. Provisional Application Ser. No. 62/447,562 filed on Jan. 18, 2017, the contents of each of which are relied upon and incorporated herein by reference in their entireties.

FIELD

Embodiments of the disclosure generally relate to coated glass-based articles having engineered stress profiles and methods for manufacturing the same.

BACKGROUND

Strengthened glass-based articles are widely used in electronic devices as cover plates or windows for portable or mobile electronic communication and entertainment devices, such as mobile phones, smart phones, tablets, video players, information terminal (IT) devices, laptop computers, navigation systems and the like, as well as in other applications such as architecture (e.g., windows, shower panels, countertops etc.), transportation (e.g., automotive, trains, aircraft, sea craft, etc.), appliance, or any application that requires superior fracture resistance but thin and lightweight articles.

In strengthened glass-based articles, such as chemically strengthened glass articles, compressive stress is highest or at a peak at the glass surface and reduces from a peak value moving away from the surface, and there is zero stress at some interior location of the glass article before the stress in the glass article becomes tensile. Modifications to ion exchange processes can be used to address sensitivity initial flaw populations in glass-based articles to modify the stress profile of the glass to decrease sensitivity to initial flaw populations. While modifications to ion exchange processes can be used for this purpose, as strengthened glass-based articles are increasingly being utilized, it would be desirable to develop other methods to provide strengthened glass-based materials having improved reliability, while not significantly impacting mean strength of the strengthened glass-based materials. Hard, brittle coatings on the surface of glass-based articles have been utilized to provide scratch resistance to glass based articles, however, for glass-based articles having steep stress profiles, hard coatings can have a tendency to deteriorate flexural strength performance of glass-based articles with hard, brittle coatings.

SUMMARY

Aspects of the disclosure pertain to coated glass-based articles in which a coating having a Young's modulus value is applied to a laminated substrate comprising a core substrate, a first cladding substrate and a second cladding substrate. The first cladding substrate has a cladding substrate Young's modulus value that is less than the coating Young's modulus value. Other aspects of the disclosure pertain to methods of manufacturing coated glass-based articles described herein.

BRIEF DESCRIPTION OF THE DRAWINGS

The accompanying figures, which are incorporated in and constitute a part of this specification, illustrate several embodiments described below.

DETAILED DESCRIPTION

Figure 1:
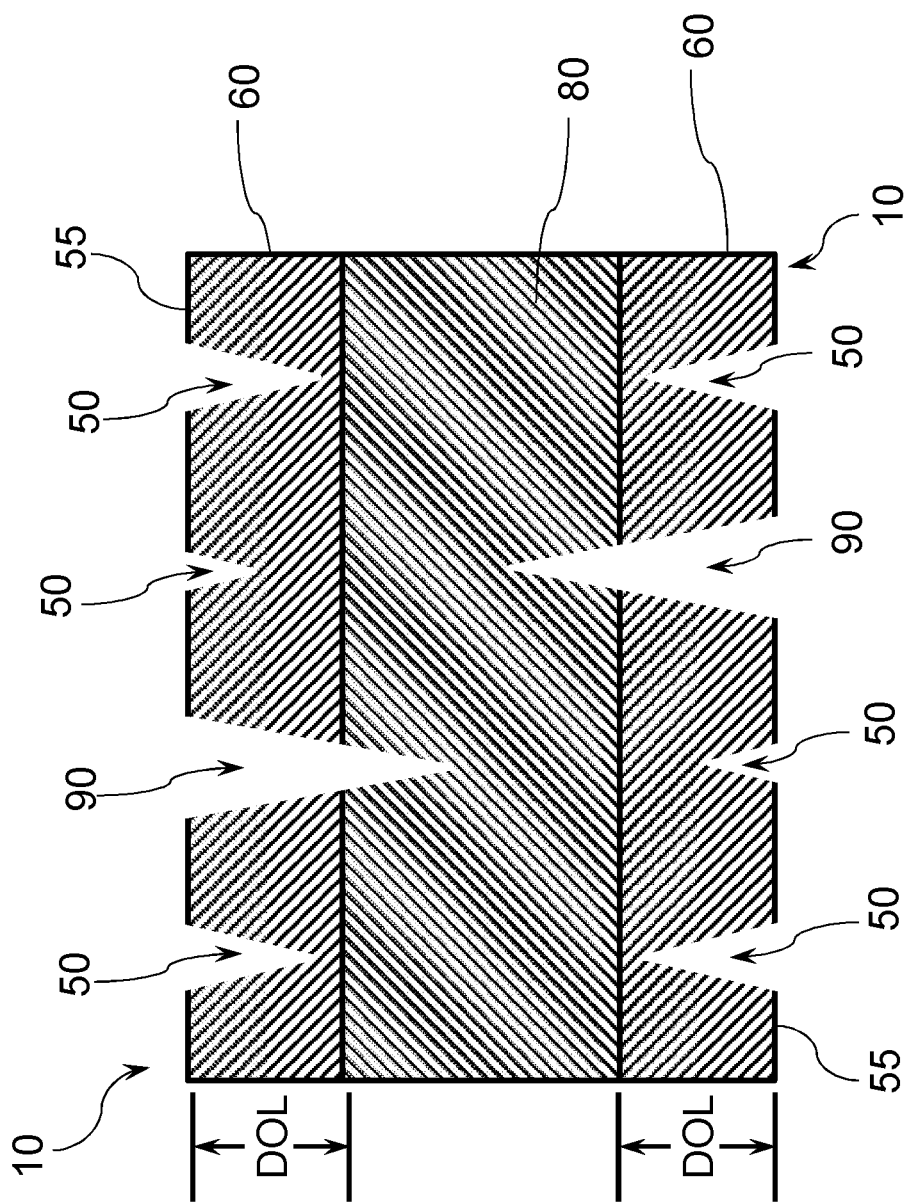
FIG. 1 illustrates an embodiment of a glass-based substrate with a surface having a plurality of cracks.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

One or more embodiments of the disclosure provide coated, glass-based articles including a glass-based substrate having an engineered stress profile. The glass-based articles in one or more embodiments are laminated glass-based articles. In one or more embodiments coated glass-based articles are provided that include designed stress profiles that provide resistance to failure due to deep damage. In one or more embodiments, the coated glass-based articles are not bendable. In one or more embodiments, the coating comprises material with the same or higher Young's modulus than the cladding of the laminated, strengthened glass-based substrate. According to one or more embodiments, the coating has no residual stress or a compressive residual stress. In one or more embodiments, the coating has a tensile stress. For the case where the coating has no residual stress, a stress profile is provided that is similar to a stress profile that is obtained by shifting an ion-exchange profile by a certain distance into the laminated glass-based article, with the cladding substrate of the glass-based article having no compression. This configuration according to modeling and preliminary experimental data will be less sensitive to initial glass flaws compared to the original laminated strengthened glass-based substrate while having about the same mean strength. Coatings can include multi-layer coatings. The glass-based substrates can be planar, or they can be curved in one or more directions (e.g., x, y and/or z planes) to provide a three-dimensional laminated substrate. In one or more embodiments, the laminated glass-based substrates are curved in at least one direction (e.g., x, y and/or z planes). In one or more embodiments, the laminated, glass-based substrates can have 2.5-dimensionality, for example, by having beveled edges. The stress profile of the laminated, glass-based substrates can be symmetrical (the same on opposite sides of a glass substrate) or asymmetrical (stress profile on one side of the substrate is different from the stress profile on the opposite side of the substrate.

According to one or more embodiments, coated glass-based articles are provided. In one or more embodiments, laminated glass-based articles include a coating to protect the glass-based article from damage, such as sharp contact induced fracture and surface scratches. In one or more embodiments, one or more coatings may be applied for other functions such as for a capacitive touch sensor, or other optical qualities. Thus, embodiments of the disclosure pertain to glass-based articles having multiple layers of coatings on the glass-based article. In an embodiment, a multi-layer scratch resistant coating (e.g., an 8-layer scratch resistant coating) having a thickness of approximately 2 micrometers is provided, which can be the only coating or combined antireflective coatings, coatings for matching reflective index of the coating to the underlying glass-based substrate, and other functional coatings. High stiffness coatings, namely, coatings having a relatively high Young's modulus compared to the Young's modulus of the cladding that tend to be brittle have resulted in a need for glass based articles with stress profiles to mitigate strength reduction associated with the high stiffness, brittle coatings. In one or more embodiments laminated glass-based articles are provided that include designed stress profiles that provide resistance to failure due to deep damage. The flexural strength (measured using a test such as ring-on-ring) of glass based articles with high stiffness, brittle coatings is a function of the maximum surface stress, and the shape of the profile between the coating/glass interface and a depth of 10 to 30 micrometers, depending on the shape of the profile is of interest. According to one or more embodiments, laminated glass-based articles have a stress profile that exhibit improved flexural strength of the coated glass-based article, and/or deep damage introduction resistance for composite product.

Coated glass-based articles are disclosed, the articles having optimized stress profiles against deep flaws. In some embodiments, the optimized stress profiles improve the glass-based article drop performance by improving the retained strength for deep flaws, for example, flaws greater than 100 microns, while also having sufficient flexural strength due to a high compressive stress at the surface. In one or more embodiments, the optimized drop performance is due to a specially designed stress profile which creates high compressive stress at regions where the flaws due to damage introduction are expected to terminate. In one or more embodiments, the coated, laminated glass-based articles exhibit a compressive stress profile in which there is a steeper tangent at or near the surface (i.e., a spike in the stress profile at the surface). The stress profile of one or more embodiments features the presence of two distinct regions having tangents within certain ranges—one with a relatively steep tangent and one with a shallow tangent.

In an embodiment, the proposed stress profiles can be achieved through modified ion exchange processes, for example, two or more ion exchange processes or a combination of two or more different strengthening mechanisms, e.g., lamination strengthening due to CTE mismatch, ion exchange (chemical tempering) or thermal tempering. Embodiments of glass based articles are generally less than 2 mm thick and the brittle coating thickness is generally less than 10 micrometers and thicker than 10 nanometers. According to one or more embodiments, coated glass-based article stress profiles can be tuned to improve flexural strength, deep damage resistance, or both. In certain embodiments, because smooth surface drop failure is controlled by flexural strength, improved resistance to coating flaw propagation will also improve smooth surface drop performance. Coated glass-based articles with optimized stress profile and a brittle functional coating are expected to exhibit better performance compared to standard ion-exchanged glass-based article or deep depth of layer glass-based article with the same coating.

In one or more embodiments, optimized stress profiles can significantly increase laminated glass-based article's strength protection against deep flaws (for example, greater than 70 µm, greater than 80 µm, greater than 90 µm, greater than 100 µm, greater than 110 µm, greater than 120 µm, greater than 130 µm, greater than 140 µm, greater than 150 µm, greater than 160 µm, greater than 170 µm, greater than 180 µm, greater than 190 µm, greater than 200 µm, greater than 210 µm, greater than 220 µm, greater than 230 µm, greater than 240 µm, and greater than 250 µm) to improve its mechanical reliability against drop-induced damage compared to profiles obtained by standard single ion exchange strengthening or lamination. In one or more embodiments, optimized stress profiles can also have comparable flexural strength behavior against shorter flaws (for example, less than 10 µm). In one or more embodiments, optimized stress profiles can be created to provide better stress corrosion resistance against deep flaws (for example, greater than 70 µm, greater than 80 µm, greater than 90 µm, greater than 100 µm, greater than 110 µm, greater than 120 µm, greater than 130 µm, greater than 140 µm, greater than 150 µm, greater than 160 µm, greater than 170 µm, greater than 180 µm, greater than 190 µm, greater than 200 µm, greater than 210 µm, greater than 220 µm, greater than 230 µm, greater than 240 µm, and greater than 250 µm).

According to one or more embodiments, optimized stress profiles can be achieved through a lamination process followed by a coating process. Profiles can be created by laminating glass-based substrates to both sides of a core substrate having an ion exchange profiles to provide a laminate stack, and then ion exchanging the laminate stack to provide the laminated glass-based substrates. The laminated glass-based substrate has tension on cladding glass and compression on core glass that is opposite to conventional laminated glass. The relative ion diffusivities of the core and cladding can provide another way to control stress profiles in glass-based articles. A coating is applied to the laminated glass based article.

Damage associated with drop events can cause chipping and densification near the surface of glass-based substrates, which, for error function profiles, coincides with the highest residual compressive stress. According to one or more embodiments, buried peak profiles can be obtained, wherein the stress is buried and unaffected by the surface damage caused during drop events on rough surfaces.

In one or more embodiments, the compositions of the core and clad glass-based substrates can be the same or different, which can permit the integration of new design features and applications. According to one or more embodiments, different compositions of the core and clad glass substrates can be utilized to further increase the deep damage fracture resistance of the glass-based substrate, for instance, by utilizing a coefficient of thermal expansion (CTE) difference to create compressive stress in the clad layers, resulting in improved rough surface drop performance. In one or more embodiments, the thickness of the clad glass-based substrate can be varied to precisely locate the depth of a buried peak of a stress profile. As used herein, "buried peak" with reference to a stress profile refers to a localized maximum on a stress versus depth from surface of the glass plot, where the localized maximum or peak has a higher stress magnitude of compressive stress than a point between the buried peak and the exterior surface of a glass-based article.

In one or more embodiments, the core and clad substrate properties, such as ion diffusivity, can be selected to precisely control the distribution of the buried peak and surface compression residual stresses of the glass-based articles. For example, a low ion diffusivity core and high ion diffusivity clad will result in a buried peak that is similar to a standard ion exchange error function profile, however, according to one or more embodiments, the glass articles described herein are different in that there is a greater degree of flexibility in designing stress profiles and tunability of stress profiles compared to existing profiles. Use of glass substrates with different ion diffusivities can control characteristics of the buried peak such as stress magnitude and CS depth. In one or more embodiments, a sensor layer can be incorporated into the ion exchanged stack of substrates.

In one or more embodiments, glass-based articles having optimized stress profiles against deep flaws to improve cover glass's drop performance without sacrificing flexural strength small and large flaws (less than 10 µm and greater than 75 µm) are provided. Also provided are methods of obtaining optimized stress profiles against deep flaws to improve cover glass's drop performance.

In one or more embodiments, coated, glass-based articles are provided having optimized stress profile for drop, scratch, and flexural performance and a method to produce such a profile. In an embodiment, an optimized profile can be created through a combination of ion exchanges and bonding thin glass-based cladding substrates to a core substrate by covalent bonding. In one or more embodiments, a method of creating such optimized profiles can include selecting a glass substrate having a predetermined composition to provide the core substrate of the laminated glass-based article. The predetermined composition is chosen according to one or more embodiments in view of several downstream processes that will change the profile magnitude and shape, which will be discussed in more detail later. In one or more embodiments, the core substrate is chemically strengthened, and the resulting stress profile is also predetermined in terms of magnitude of stress at the surface and depth of stress layer. In one or more embodiments, two cladding substrates that are in a range of about 50 to 150 µm thick and having a predetermined thickness and composition are bonded to the core substrate. In one or more embodiments, the cladding substrates can be bonded to the core substrate by covalent bonding.

In one or more embodiments, the high temperatures to form covalent bonds may cause additional ion diffusion within the ion exchanged core substrate, which will lower the magnitude of the stress, but increase the depth of the stress. It is also possible that the sodium and potassium ions in the core substrate may diffuse into the clad glass, but the modeling used herein has assumed that the interface between the core and cladding was non-permeable. After bonding, the entire laminated article is again ion exchanged to create compressive stresses in the thin cladding substrates. The stress profile will impart flexural strength to the laminated glass article. The second ion exchange will reduce the magnitude of the core ion exchange and will further increase its depth due to diffusion and the total energy stored will be maintained.

Figure 4:
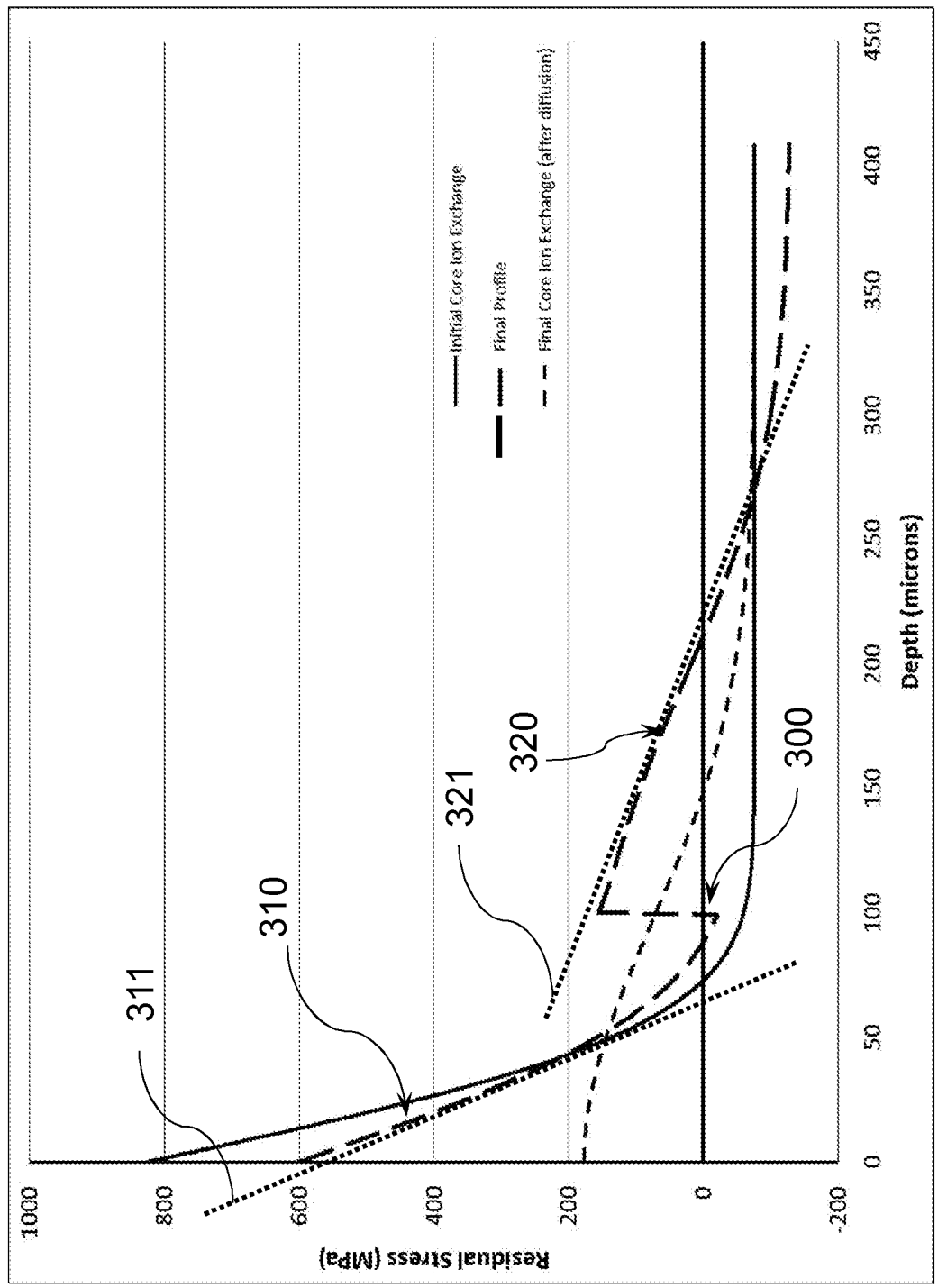
FIG. 4 illustrates a modelled stress profile of an uncoated, laminated glass-based article.

FIG. 4 illustrates the various stress profile at the stages of the process for forming the laminated glass-based articles prior to coating according to one or more embodiments. The solid line shows a chemically strengthened core substrate exemplary stress profile shown. Two layers of glass cladding substrates, each having the same thickness and composition are bonded to the surfaces of the chemically strengthened core glass substrate. The composition of the cladding glass substrates can be different than the core glass, and thickness of the cladding glass substrates will generally be thinner than the core glass substrate. The entire laminated glass article is then chemically strengthened, resulting in an exemplary stress profile such as the one shown in by the long dashed line. Thermal processing to bond the substrates changes the stress profile of the core glass substrate shown by solid line to the stress profile represented by the small dashed line due to non-permeable boundary layer diffusion. The final stress profile is the superposition of the small dashed line with the ion exchange profile that was applied to the outer layers. The stress profile includes a first portion 310 where all points comprise a relatively steep tangent 311 close to the surface and second portion 320 where all points comprise a relatively shallow tangent 321 compared to the steep tangent 311. In one or more embodiments, the first portion comprising the steep tangent 311 and the second portion comprising the relatively shallow tangent 321 is such that there is a ratio of the steep tangent to the relatively shallow tangent of greater than 1, greater than 2, greater than 4, greater than 8, greater than 10, greater than 15, greater than 20, greater than 25, greater than 30, or greater than 35 and less than 40. In one or more embodiments, the first portion relatively steep tangent 311 has an absolute value in a range of 3 MPa/micron and 40 MPa/micron, and the second portion relatively shallow tangent 321 has an absolute value in a range of 0.5 MPa/micron and 2 MPa/micron. In some embodiments, the tangent may be described and used interchangeably with "local gradient," which is defined as the change in stress magnitude as a function of depth. Application of a stiff or brittle coating to the laminate having the stress profile shown in FIG. 4 will provide enhanced flexural strength to the laminated glass-based article, as will be understood further below.

In one or more embodiments, the coated glass-based article has a stress profile that does not follow a single complementary error function. The example shown in FIG. 4 is based on a 1.0 mm in total thickness, with the cladding substrates each being 100 μm thick, and the core substrate being 800 μm thick.

In one or more embodiments, a process to bond the core substrate to the cladding substrates to form a laminate stack can include cleaning the surfaces of the core substrate and cladding substrates with a high pH solution. For example, what is known as a RCA clean or SC1 process may be used. In one or more embodiments, a RCA clean process includes removal of organic contaminants (organic clean+particle clean), removal of a thin oxide layer (oxide strip, optional) and removal of ionic contamination (ionic clean). The substrates can be soaked in water, such as deionized water, and rinsed with water between each step. In one or more embodiments, the cleaning can include only a SC1 (referring to a standard clean process) process, which involves cleaning the substrates a solution of deionized water and aqueous ammonium hydroxide (for example, 29% by weight $NH_3$) and hydrogen peroxide (for example, 30%). An exemplary SC1 solution can include 5 parts (by volume) water, 1 part ammonium hydroxide and 1 part aqueous hydrogen peroxide. The cleaning can occur at room temperature (for example, about 25° C.), or an elevated temperature in a range of 50° C. to 80° C. The substrates can be placed in the solution for 1 minute to 30 minutes. This solution cleaning removes organic residues and particles.

According to one or more embodiments, in addition to the SC1 process, an optional oxide strip may be performed. This oxide strip, according to one or more embodiments, includes immersion in a 1:100 or 1:50 solution of aqueous HF hydrofluoric acid at a temperature in a range of from 25° C. to 80° C. for a period of time of from about fifteen seconds to about 5 minutes, in order to remove a thin oxide layer and some fraction of ionic contaminants. In one or more embodiments, a third step includes an ionic clean. In an exemplary embodiment, a solution of water (e.g., deionized water), aqueous HCl (hydrochloric acid, for example 37% by weight) and aqueous hydrogen peroxide (for example, 30% by weight) is provided. An example of solution is 6 parts (by volume) deionized water, 1 part HCl and 1 part hydrogen peroxide. The substrates are placed in a solution at room temperature (for example, about 25° C.), or at an elevated temperature in a range of 50° C. to 80° C. The substrates can be placed in the solution for 1 minute to 30 minutes. This ionic cleaning treatment effectively removes the remaining traces of metallic (ionic) contaminants, some of which were introduced in the SC-1 cleaning step. In an optional step, the substrates can be rinsed in water (such as deionized water) and then placed in a stack and heated to a temperature exceeding about 400° C. for about an hour with continued applied pressure. The resulting laminated glass-based article will comprise the cladding substrates and the core substrate bonded together. After lamination, the entire laminated glass article is ion exchanged to create compressive stresses in the thin layers of cladding substrates. According to one or more embodiments, the resulting stress profile will impart flexural strength to the laminated glass-based article. The ion exchange of the laminated glass-based article according to some embodiments will reduce the magnitude of the core ion exchange and will further increase its depth due to diffusion and the total energy stored will be maintained.

As used herein, the terms "glass-based article" and "glass-based substrates" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %). Glass substrates according to one or more embodiments can be selected from soda lime glass, alkali aluminosilicate glass, alkali containing borosilicate glass and alkali aluminoborosilicate glass. In one or more embodiments, the substrate is a glass, and the glass can be strengthened, for example, heat strengthened, tempered glass, or chemically strengthened glass. In one or more embodiments, strengthened glass-based substrates have a compressive stress (CS) layer with a CS extending within the chemically strengthened glass from a surface of the chemically strengthened glass to a compressive stress depth of compression layer (DOC) of at least 10 μm to several tens of microns deep. In one or more embodiments, the glass-based substrate is a chemically strengthened glass-based substrate such as Corning Gorilla® glass. The various glass-based articles described herein can be selected from an architectural glass substrate, a vehicle glazing, a vehicle interior glass substrate, an appliance glass substrate, a handheld device glass substrate, and a wearable device glass substrate.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant.

As used herein, DOC refers to the depth at which the stress within the glass-based article changes compressive to tensile stress. At the DOC, the stress crosses from a positive (compressive) stress to a negative (tensile) stress and thus exhibits a stress value of zero.

As used herein, the terms "chemical depth", "chemical depth of layer," "depth of layer" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value.

According to the convention normally used in the art, compression is expressed as a negative (<0) stress and tension is expressed as a positive (>0) stress. Throughout this description, however, CS is expressed as a positive or absolute value—i.e., as recited herein, CS=|CS|.

FIG. 1 illustrates an exemplary strengthened glass-based substrate 10 having a plurality of cracks, illustrating how subsurface damage can result in a failure. Compressive stress regions 60 extending from an outer surface 55 of the glass-based substrate 10 to a depth of compressive stress layer (DOC) is under a compressive stress (CS). Cracks 50 in the compressive stress region 60 of the exemplary strengthened glass-based substrate 10 that do not extend into the central tension region 80 of the glass are shown, along with cracks 90 that penetrate into the central tension regions 80 of the glass, which are regions under tensile stress or central tension (CT). Although the incorporation of a CS in a near surface region of the glass can inhibit crack propagation and failure of the glass-based substrate, if the damage extends beyond the DOC, and if the CT is of a high enough magnitude, the flaw will propagate over time until it reaches the materials critical stress intensity level (fracture toughness) and will ultimately fracture the glass.

Figure 2:
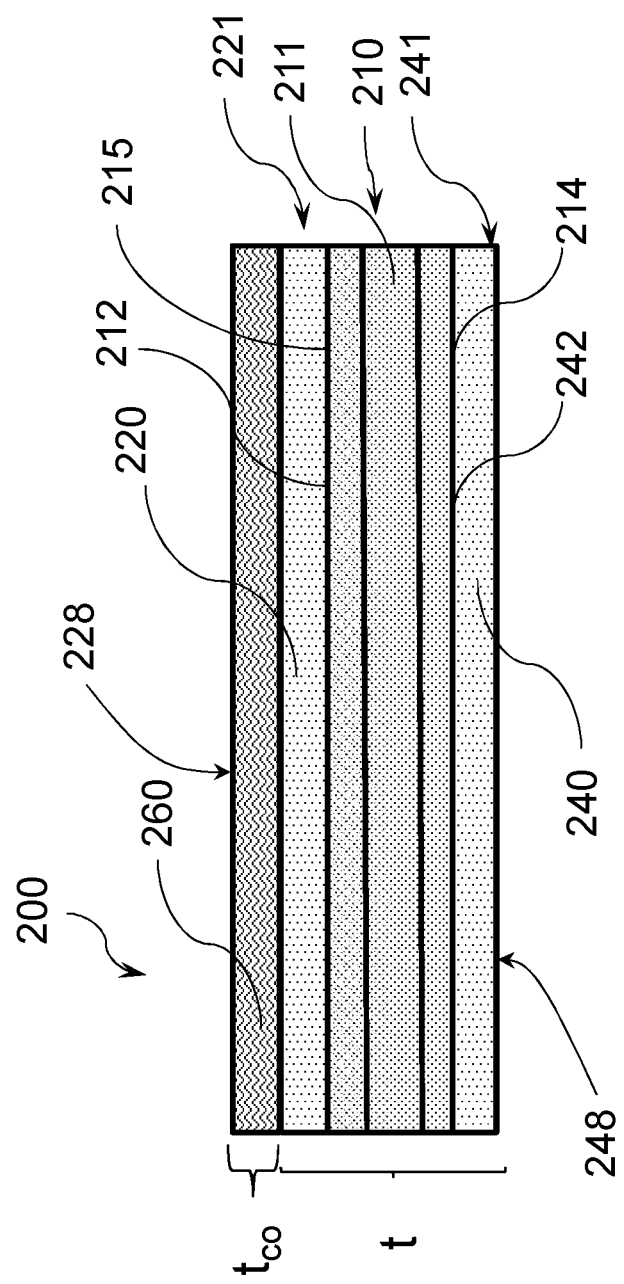
FIG. 2 illustrates an embodiment of a coated, laminated glass-based article.

Referring now to FIG. 2, a first embodiment of the disclosure pertains to a glass-based article 200, which comprises a glass-based substrate 210 having a first surface 228 and a second surface 248 opposing the first surface 228 defining a substrate thickness (t) in a range of about 0.1 millimeters to 3 millimeters, the glass-based substrate having a compressive region 220 having a first compressive stress CS maximum at the first surface 228 of the glass-based article extending to a depth of layer 215 and second local CS maximum at a depth of at least 25 µm from the first surface 228. In one or more embodiments, the glass-based article 200 has a second compressive region 240 having a third compressive stress CS maximum at the second surface 248 of the glass-based substrate 210 extending to a depth of layer 242 and fourth local CS maximum at a depth of at least 25 µm, 50 µm, 75 µm or 100 µm from the second surface 248. In one or more embodiments, the glass-based substrate has a substrate Young's modulus value. In one or more embodiments, a coating 260 is on the second surface 228, the coating 260 having a coating Young's modulus value greater than the substrate Young's modulus. The coating 260 has a coating thickness $t_{co}$.

In a second embodiment, the glass-based substrate 210 comprises a glass-based core substrate 211 having a first side 212 and a second side 214, the glass-based core substrate 211 sandwiched between a glass-based first cladding substrate 221 and a glass-based second cladding substrate 241, the first cladding substrate 221 bonded to the first side 212 and the second cladding 241 substrate bonded to the second side 241 by a covalent bond. The glass-based article shown in FIG. 2 comprising the core substrate and the first cladding substrate 221 and second cladding substrate 241 may be referred to as a laminate stack. According to one or more embodiments, covalent bonding refers to a bond that is a molecular bond that is a chemical bond that involves sharing of electron pairs, which are known as shared pairs or bonding pairs. According to one or more embodiments, covalent bonding may include σ-bonding, π-bonding, metal-to-metal bonding, agostic interactions, bent bonds, and three-center two-electron bonds. In one or more embodiments, the covalent bond comprises bond comprises a Si—O—Si bond.

In a third embodiment, the glass-based article of the second embodiment is such that the core substrate comprises a first glass composition and the first cladding substrate 221 and the second cladding substrate 241 each comprises a second glass composition, wherein the first glass composition is different from the second glass composition. In a fourth embodiment, the glass-based article of the third embodiment is such that the first glass composition has a first ion diffusivity and the second glass composition each has a second ion diffusivity, and the first ion diffusivity and second ion diffusivity are different. In a fifth embodiment, the glass-based articles of the third and the fourth embodiments are such that the first glass composition has a first coefficient of thermal expansion (CTE) and the second glass composition each has a second coefficient of thermal expansion (CTE), and the first CTE and second CTE are different. In a sixth embodiment, the glass-based article of the fifth embodiment is such that the second CTE is lower than the first CTE to impart a compressive stress in the first cladding substrate and second cladding substrate.

In a seventh embodiment, the glass-based articles of the third through the seventh embodiments are such that the core substrate 211 has a first stress profile and the first cladding substrate 221 and second cladding substrate 241 each has a second stress profile, wherein the first stress profile is different from the second stress profile. In an eighth embodiment, the glass-based articles of the third through seventh embodiments are such that the first glass composition has a first Young's modulus value and the second glass composition has a second Young's modulus value, and the first Young's modulus value and second Young's modulus value are different and the coating Young's modulus value is greater than the second Young's modulus value. In a ninth embodiment, the glass-based article of the eighth embodiment is such that the second Young's modulus value is greater than the first Young's modulus value. In a tenth embodiment, the glass-based article of the eighth embodiment is such that the second Young's modulus value is less than the first Young's modulus value.

In an eleventh embodiment, glass-based article of any of the first through tenth embodiments are such that the glass-based article has compressive stress versus depth from the first surface 228 providing a stress profile including a first portion where all points comprise a relatively steep tangent and a second portion where all points comprise a relatively shallow tangent compared to the relatively steep tangent. In a twelfth embodiment, the glass-based article of the tenth embodiment is such that a ratio of the steep tangent to the relatively shallow tangent is greater than 2. In a thirteenth embodiment, glass-based article of the eleventh embodiment is such that the steep tangent has an absolute value in a range of 10 MPa/micron and 20 MPa/micron, and the steep tangent has an absolute value in a range of 0.5 MPa/micron and 2 MPa/micron. In a fourteenth embodiment, glass-based article of any of the first through thirteenth embodiments is such that the coating having a coating thickness ($t_{co}$) in a range of about 80 nanometers and 10 micrometers.

In a fifteenth embodiment, glass-based article of any of the first through fourteenth embodiments is such that the substrate has a Young's modulus value is in a range of 60 GPa and 80 GPa and the coating has a Young's modulus value is in a range of 70 GPa and 400 GPa. In a sixteenth embodiment, glass-based article of any of the first through fifteenth embodiments is such that the coating Young's modulus value is in a range of 100 GPa and 300 GPa. In a seventeenth embodiment, any of the first through sixteenth embodiments is such that the coating is a scratch resistant coating selected from $Al_2O_3$, Mn, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof.

In an eighteenth embodiment, glass-based article of any of the first through seventeenth embodiments is such that the article has a compressive stress profile with a first maximum compressive stress at the first surface sufficient to provide flexural strength to prevent failure of the glass-based article from a flaw that originates in the first coating. In a nineteenth embodiment, glass-based article of the eighteenth embodiment is such that the first maximum compressive stress is in a range of 800 MPa and 1200 MPa, for example, 900 MPa, 1000 MPa, or 1100 MPa.

Figure 3:
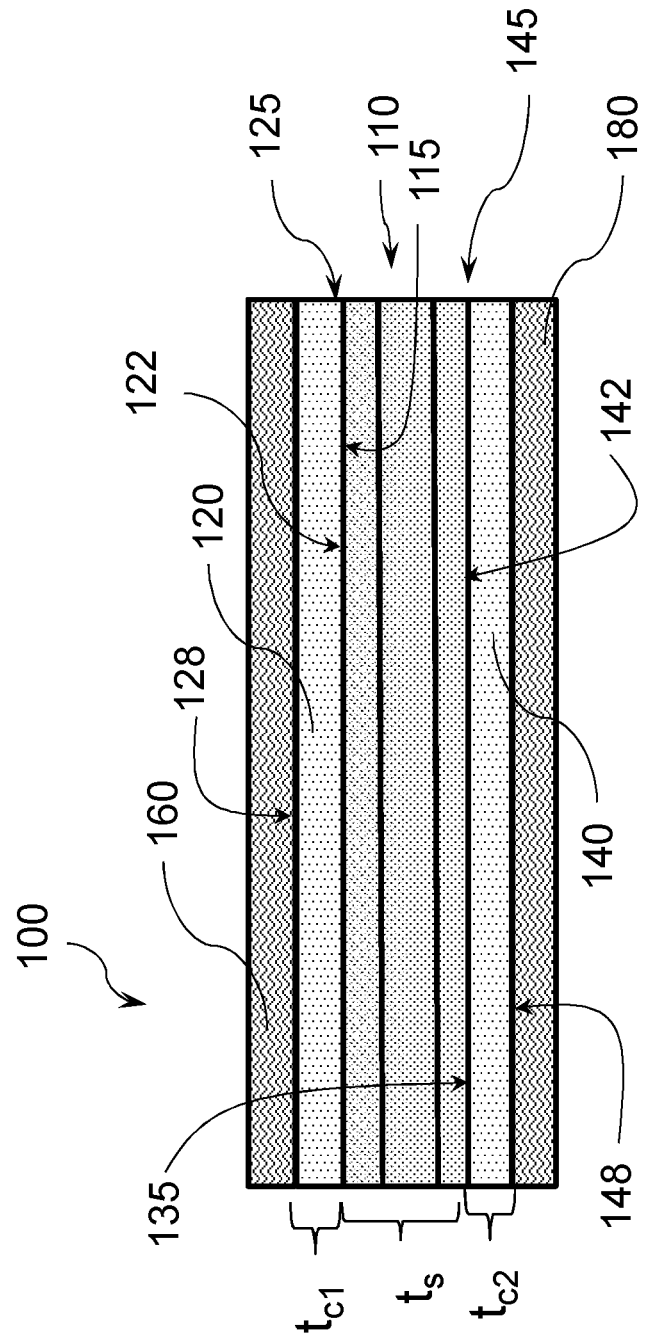
FIG. 3 illustrates another embodiment of a coated, laminated glass-based article.

Referring now to FIG. 3, a twentieth embodiment of the disclosure pertains to a coated glass-based article 100, comprising a strengthened glass-based core substrate 110 having a first surface 115 and a second surface 135. The strengthened glass-based substrate 110 in one or more embodiments is chemically strengthened, or thermally strengthened or chemically and thermally strengthened. The laminated glass-based article 100 further comprises a chemically strengthened glass-based first cladding substrate 120 having a third surface 122 directly bonded to the first surface to provide a first core-cladding interface 125. The laminated glass-based article 100 further comprises a chemically strengthened glass-based second cladding substrate 140 having a fourth surface 142 directly bonded to the second surface 135 to provide a second core-cladding interface 145. In one or more embodiments, the core substrate, the first cladding substrate and the second cladding substrate may be referred to as a laminate stack when they are assembled together. According to one or more embodiments, the core substrate 110 is bonded to the first cladding substrate 120 and the second cladding substrate 140 without a polymer between the core substrate 110 and the first cladding substrate 120 and without a polymer between the core substrate 110 and the second cladding substrate 140. Thus, according to one or more embodiments, "directly bonded" refers to a bond in which there is no additional bonding material such as an adhesive, epoxy, glue, etc. bonding the first cladding substrate 120 and the second cladding substrate 140 to the core substrate 110. In some embodiments, the first cladding substrate 120 and the second cladding substrate 140 are each directly bonded to the core substrate 110 by covalent bonding. The first cladding substrate 120 is shown as having a thickness ti, the second cladding substrate 140 is shown as having a thickness $t_{c2}$, and the core substrate 110 has a thickness of $t_s$. The core substrate 110 comprises a first glass composition and the first cladding substrate 120 and second cladding substrate 140 each comprise a second glass composition, the first glass composition being different from the second glass composition, wherein the first glass composition has a first Young's modulus value and the second glass composition has a second Young's modulus value, the glass-based article further comprising a first coating 160 on the first cladding substrate and, optionally a second coating 180 on the second cladding substrate 140, the first coating 160 comprising a material selected to have a first coating Young's modulus value, the first coating Young's modulus value being greater than the second Young's modulus value.

The first cladding substrate 120 is shown as having a thickness $t_{c1}$, the second cladding substrate 140 is shown as having a thickness $t_{c2}$, and the core substrate 110 has a thickness of $t_s$. The thickness of the laminated glass-based article 100 is thus the sum of $t_{c1}$, $t_{c2}$, and $t_s$. The first cladding substrate 120 has a fifth surface 128 and the second cladding 140 has a sixth surface 148, the fifth surface 128 and sixth surface 148 defining a substrate thickness.

In a twenty-first embodiment, the coated glass-based article of the twentieth embodiment further comprises a second coating 180 on the second cladding substrate 140, the second coating 180 comprising a material selected to have a second coating Young's modulus value, the second coating Young's modulus value being greater than the second Young's modulus value. In a twenty-second embodiment, the coated glass-based article of the twentieth or twenty-first embodiments is such that the strengthened core substrate 110 is chemically strengthened and the first cladding substrate 120 has a stress profile that is optimized to resist failure from deep flaws. In a twenty-third embodiment, the coated glass-based article 100 of the twenty-second embodiment is such that the first cladding substrate 120 has the fifth surface 128 the glass-based article 100 having a compressive stress profile with a first maximum compressive stress at the fifth surface sufficient to provide flexural strength to prevent failure of the glass-based article from a flaw that originates in the first coating. In a twenty-fourth embodiment, the first maximum compressive stress is in a range of 500 MPa and 1200 MPa. In a twenty-fifth embodiment, the first maximum compressive stress is in a range of 800 MPa and 1200 MPa, for example, 900, 1000, or 1100 MPa.

In a twenty-sixth embodiment, the coated glass-based articles of the twentieth through twenty-fifth embodiments are such that the fifth surface 128 and sixth surface 148 define a thickness in a range of about 0.1 millimeters to 3 millimeters prior to coating. In a twenty-seventh embodiment, the coated glass-based article of the twentieth through twenty-sixth embodiments is such that the first coating 160 has a thickness is in a range of 5 nanometers and 5 micrometers. In a twenty-eighth embodiment, the coated glass-based articles of the twentieth through twenty-sixth embodiments are such that first coating 160 has a thickness is in a range of 10 nanometers to 2 micrometers.

In a twenty-ninth embodiment, the coated glass-based articles of the twentieth through twenty-eighth embodiments are such that the first coating is selected from the group consisting of silica, indium tin oxide, aluminum oxynitride, porous silica, a glass-ceramic or a ceramic. In a thirtieth embodiment, the coated glass-based articles of the twentieth through twenty-ninth embodiments are such that glass-based substrate comprises an ion exchangeable alkali aluminosilicate glass composition, and in a thirty-first embodiment, the glass composition is an ion exchangeable alkali aluminoborosilicate glass composition. In a thirty-second embodiment, the coated glass-based article of the twentieth through thirtieth embodiments is such that the first cladding thickness is selected to promote stable crack growth for cracks in a range of 25 and 150 microns.

A thirty-third embodiment pertains to a method of manufacturing a coated glass-based article comprising bonding a glass-based first cladding substrate to a first side of a strengthened glass-based core substrate, the first cladding substrate having a first cladding substrate Young's modulus value; covalently bonding a glass-based second cladding substrate to a second side of the strengthened glass-based core substrate; chemically strengthening the first cladding substrate and the second cladding substrate; and applying a coating having a coating Young's modulus value to the first cladding substrate, the coating Young's modulus value being greater than the first cladding substrate Young's modulus value. In a thirty-fourth embodiment, the thirty-third embodiment is such that the glass-based core substrate is chemically strengthened and chemically strengthening the first cladding substrate is performed after bonding the first cladding to the core substrate and chemically strengthening the second cladding substrate is performed after bonding the second cladding substrate to the core substrate. In a thirty-fifth embodiment, the thirty-third or thirty-fourth embodiments are such that the core substrate has a first bonding surface and a second bonding surface opposite the first bonding surface, the first cladding substrate has a third bonding surface and the second cladding substrate has a fourth bonding surface, the method further comprising cleaning the core substrate, the first cladding substrate and the second cladding substrate to provide hydroxyl groups on the first bonding surface, the second bonding surface, the third bonding surface and the fourth bonding surface; and placing the first bonding surface in contact with the third bonding surface and placing the third bonding surface in contact with the fourth bonding surface to provide a laminate stack. In a thirty-sixth embodiment, the thirty-fifth embodiment includes heating the laminate stack, and in a thirty-seventh embodiment, heating the laminate stack includes heating to a temperature and for a time sufficient to form a covalent bond between the first bonding surface and the third bonding surface and a covalent bond between the second bonding surface and the fourth bonding surface, wherein the covalent bonds are formed without a polymer or adhesive. In a thirty-eighth embodiment, heating the laminate stack includes heating the laminate stack to a temperature of at least about 400° C. for a period of time of at least 30 minutes. In a thirty-ninth embodiment, the thirty-third through thirty-eighth embodiments include chemically strengthening the first cladding substrate and the second cladding substrate.

Figure 5A:
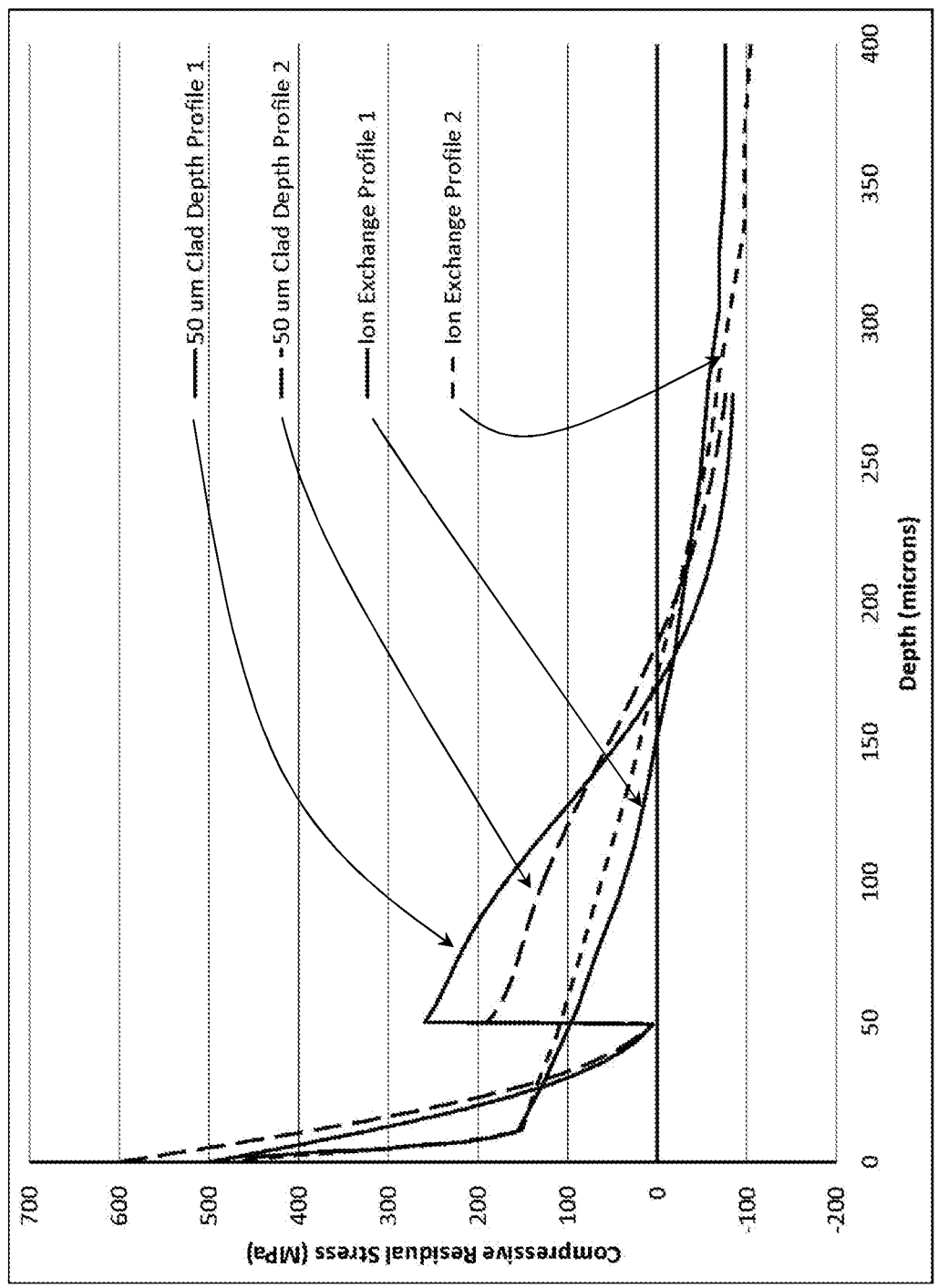
FIG. 5A illustrates a modelled stress profile of an uncoated, laminated glass-based article.

Two exemplary profiles of uncoated glass-based substrates in accordance with embodiments of the disclosure are shown in FIG. 5A. The stress profiles provided in the Figures herein were simulated using finite element modeling and fracture mechanics. In the simulations, the residual stress profile was applied to the glass-based article, a crack was explicitly inserted, four-point bending was applied to the geometry with the surface crack on the tensile side of the glass-based article, and stress intensity factors were calculated using the focused mesh approach. The strength of the plate in plane strain as a function of flaw size was then plotted. Two possible profiles generated by bonding 50 µm clads onto 800 µm substrates are shown in FIG. 5A.

The initial ion exchange profile of the core substrate is selected based upon the understanding that the bonding and second ion exchange steps will decrease the magnitude of the CS of the core glass substrate at the surface, but will also increase the depth. While not being bound by any theory, it is expected that a single ion exchange (e.g., potassium for sodium ions) will impart the desired stress profile characteristics, though additional optimization of the profile may be performed. In embodiments in which the transformation of the initial ion-exchange profile of the core substrate that occurs during bonding and ion-exchange of the laminated stack is to be minimized, then a core glass-based substrate with low diffusivity for potassium ions is selected. In alternative embodiments in which a deeper depth of compression in the core substrate is sought to be obtained, then a glass with high diffusivity for potassium ions is selected for the core glass-based substrate. In an embodiment, a high diffusivity glass contains lithium. High diffusivity glasses for the cladding substrates are selected to reduce the time of the ion-exchange the ion exchange of the laminated stack.

The resultant stress profile according to one or more embodiments has a sufficient magnitude to arrest deep damage introduced during drop events that are coincident in time with global device flexure, and also be at the correct depth to capture most of the damage. In one or more embodiments, additional thermal treatments can be applied to increase the depth of the core stress profile, and in some embodiments, the cladding substrates.

Thus, according to one or more embodiments, the glass-based articles provide a variety of ways to tune the stress profile of the glass-based article, thereby providing a high degree of stress profile tunability. Parameters that can be varied to tune the final stress profile of the glass-based articles include the stress profile shape of the core glass substrate, thermal processing critical, and the thicknesses of the cladding substrates. In one or more embodiments, the clad substrate thickness determines the beginning of the buried CS. In one or more embodiments, the ion exchange of the laminated glass stack is tailored to provide sufficient resistance to breakage from drops and flexural strength. In addition, according to one or more embodiments, an ion exchange spike can be applied at the surface to impart the desired flexural strength. The ion exchange of the laminated glass could also be tailored to provide scratch resistance.

Figure 5B:
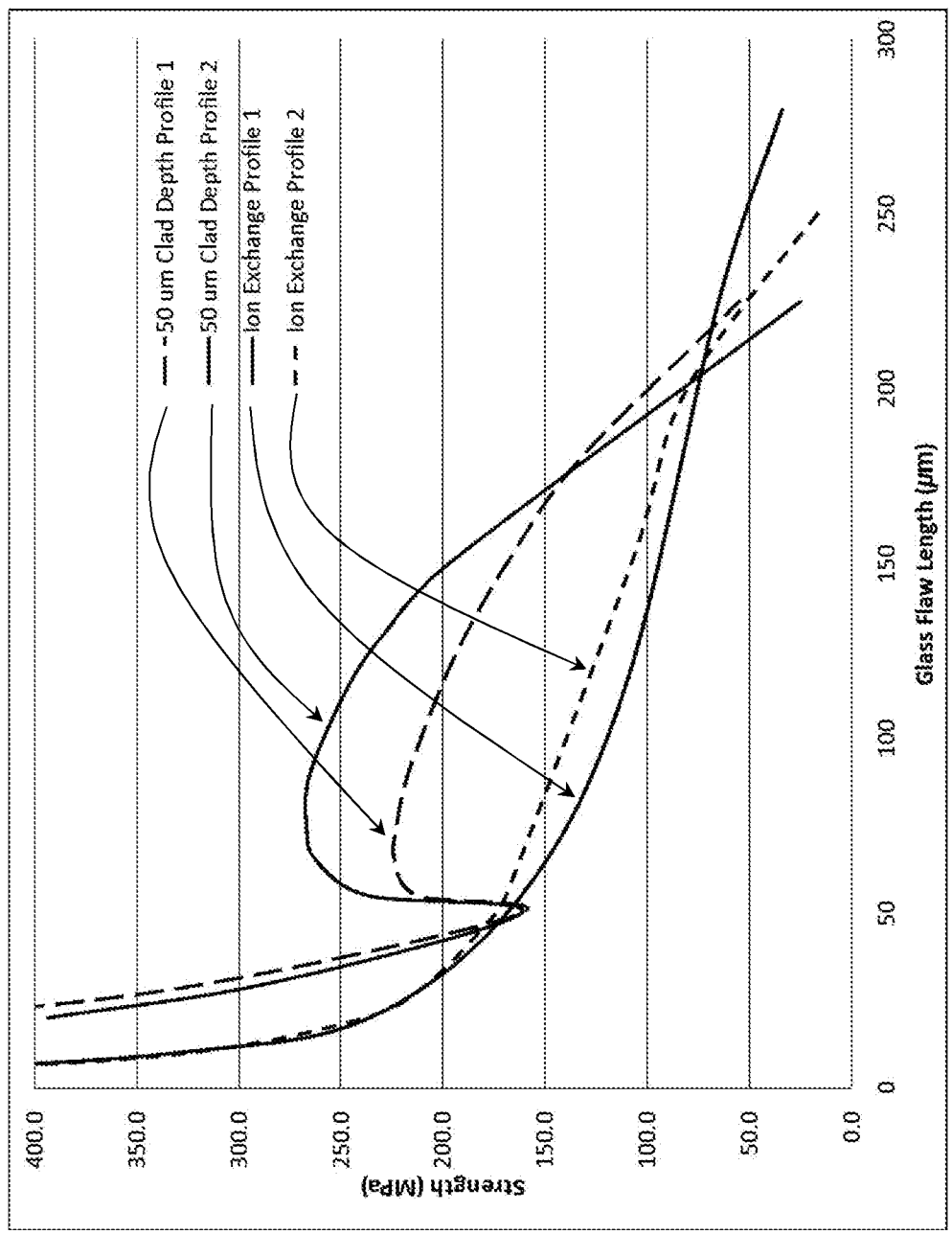
FIG. 5B illustrates a modelled strength versus flaw length plot for the stress profile in FIG. 5A.

FIG. 5B demonstrates the retained strength predictions for the two samples in FIG. 5A, and it can be seen that the stress profile shown in FIG. 5A has increased strength for flaws from 50 to 200 µm when compared to two possible approximately parabolic, deep depths of compression (DOC) profiles. Ion exchange profile 1 (solid line) and profile 2 (short dashed line) of the core glass substrates are shown as having lower strength than the profile 1 laminated article having a 50 µm cladding (long dashed line) and the profile 2 laminated article having a 50 µm cladding (solid line having the increased strength). The increased strength profiles for the laminated articles exceed twice the currently available ion exchange profile strength for some flaw depths.

Figure 6A:
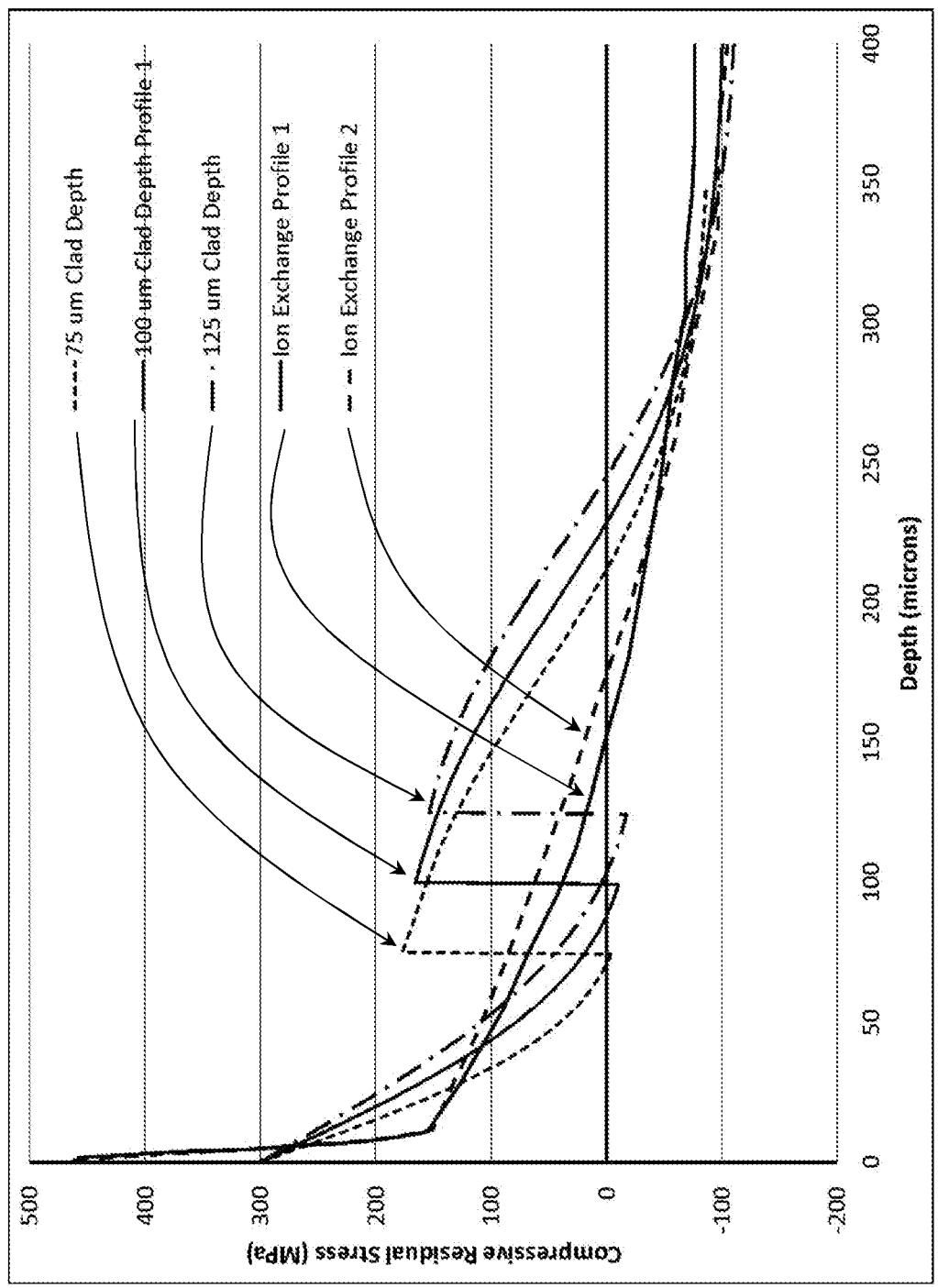
FIG. 6A illustrates a modelled stress profile of an uncoated, laminated glass-based article.
Figure 6B:
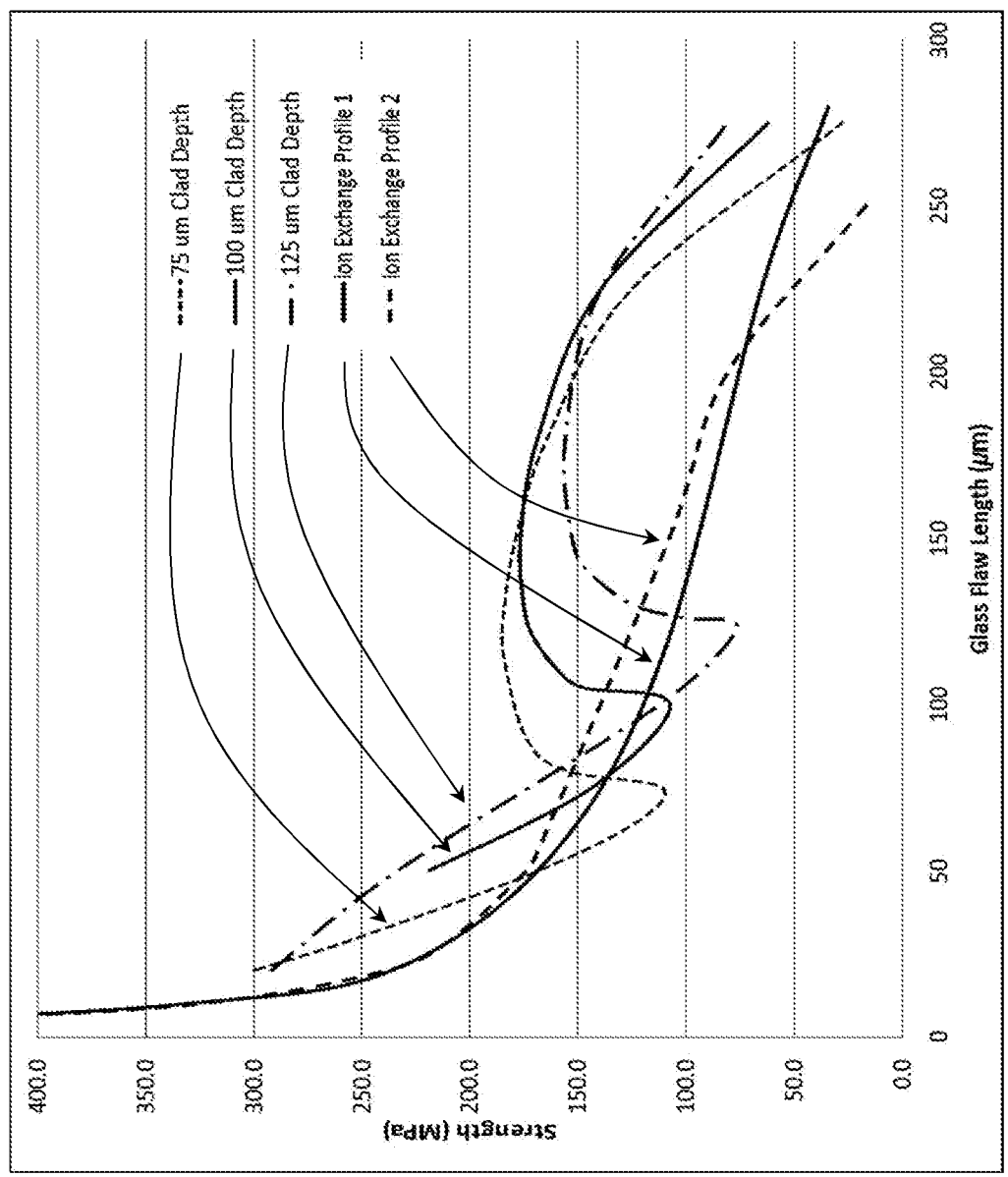
FIG. 6B illustrates a modelled strength versus flaw length plot for the stress profile in FIG. 6A.

Profiles created with 75 µm, 100 µm, and 125 µm cladding substrates are shown in FIG. 6A for two different stress profiles on a core glass substrate, and the retained strength predictions are shown in FIG. 6B for uncoated glass-based articles. The lines labeled Ion Exchange Profile 1 and Ion Exchange Profile 2 are the core glass substrate stress profile prior to applying the cladding substrates to form a laminate stack and ion exchange of the laminate stack. It can be seen that increasing the cladding substrate thickness generally decreases the maximum strength for flaws between 100 and 200 µm, but also results in increased strength for all flaws greater than 200 µm. Thus, the laminated glass-based article stress profile can be finely tuned to provide maximized strength protection against the flaws that might be introduced during drop events on a rough surface. For all simulations, the core thickness decreased as the clad thickness increased to maintain a total thickness of 1.0 mm.

In one or more embodiments, different compositions for the core substrate and cladding substrates also allow for the stress properties of the laminated glass-based article to be tailored to optimize performance for a specific application, such as drop protection for impacts on rough surfaces. The compositions of the core substrate and cladding substrates are independent from each other, which can provide a wide range of mechanical properties, such as CTE and elastic properties. Varying the CTE of the core substrate and cladding substrates provides residual stress differences that result from cooling, which will cause either compression in the core or the clad. For example, stresses due to the CTE difference between the cladding substrates and the core substrate provides the same performance while reducing the elastic energy stored in the glass. In one or more embodiments, varying the Young's modulus of the core substrate and the cladding substrates can also be performed. FIGS. 7A-B through 9A-B provide examples of uncoated glass-based articles.

Figure 7A:
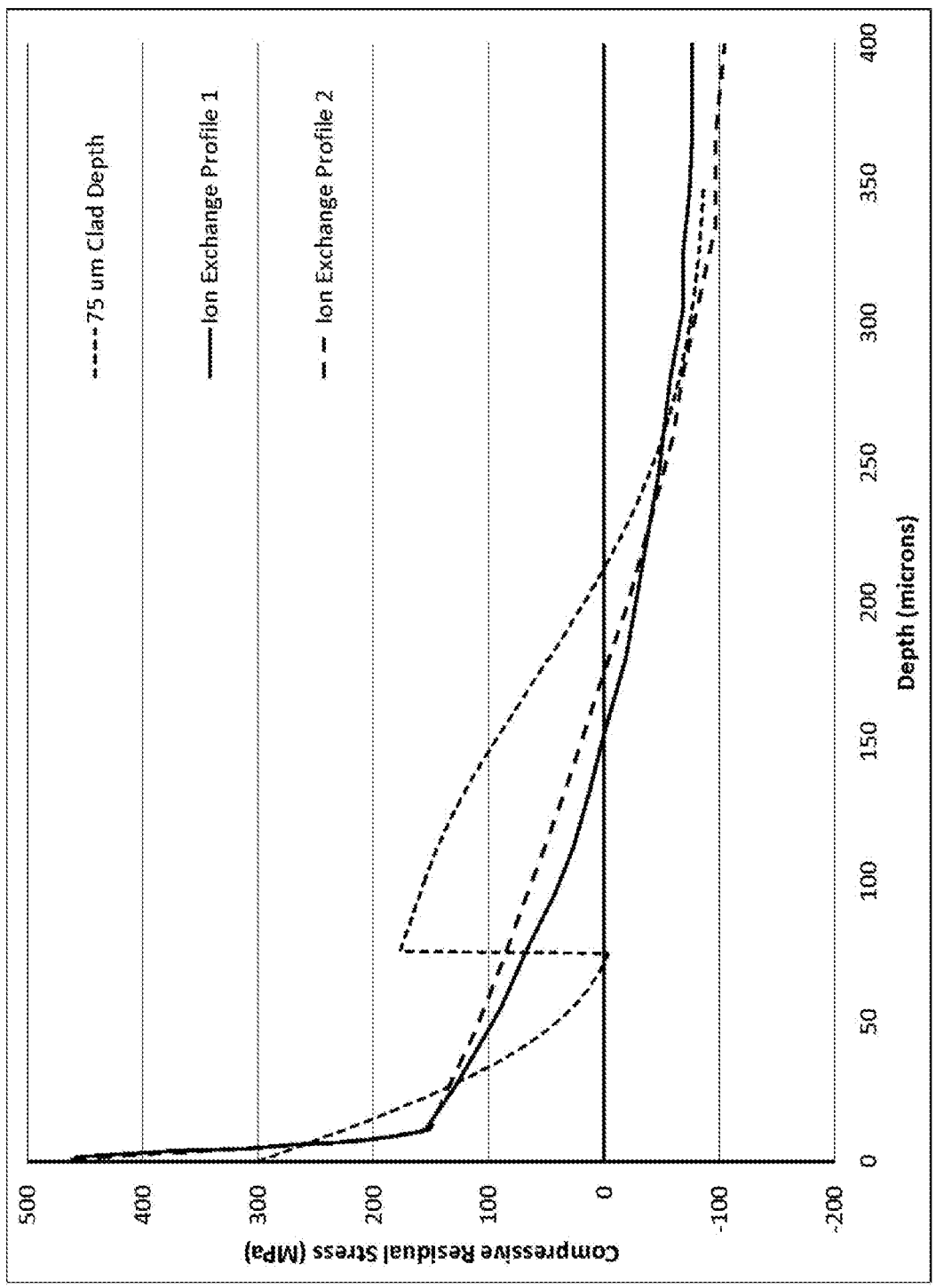
FIG. 7A illustrates a modelled stress profile of an uncoated, laminated glass-based article.
Figure 7B:
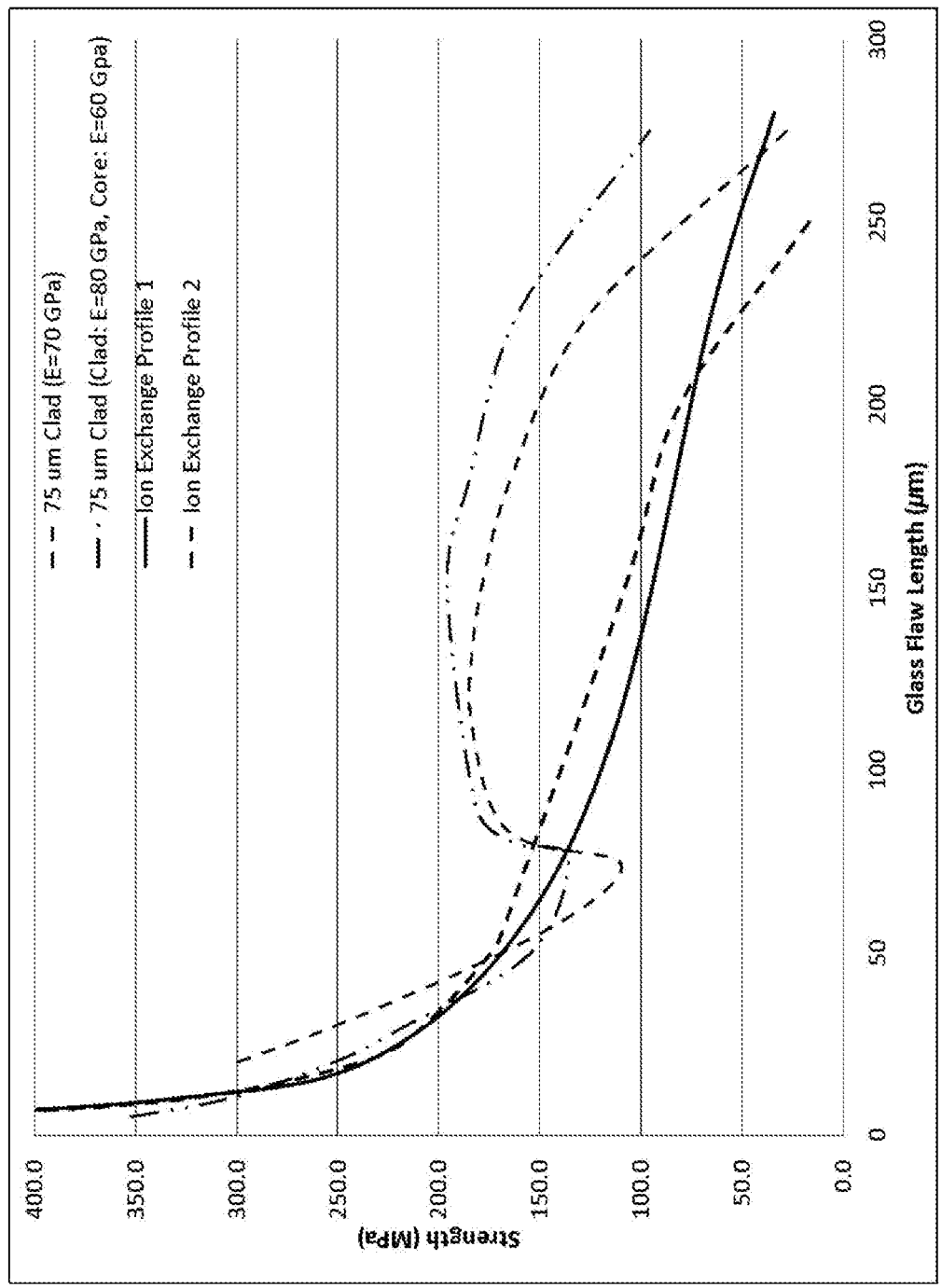
FIG. 7B illustrates a modelled strength versus flaw length plot for the stress profile in FIG. 7A.

In FIG. 7A, an exemplary profile created with two 75 μm thick cladding substrates and a total thickness of 1.0 mm compares two ion exchange profiles. Increasing the Young's modulus of the cladding substrate from 70 GPa to 80 GPa and decreasing the core Young's modulus from 70 GPa to 60 GPa results in significant increases in the strength of all flaws beyond the core/clad interface. As shown in FIG. 7B, it was found that because of the modulus mismatch the retained strength was increased for flaws that terminated in the core when compared to the case for which both the core and clad had moduli of 70 GPa. The Young's modulus value recited in this disclosure refers to a value as measured by the sonic resonance technique of the general type set forth in ASTM E1875-13, titled "Dynamic Young's Modulus, Shear Modulus, and Poisson's Ratio by Sonic Resonance."

Figure 8A:
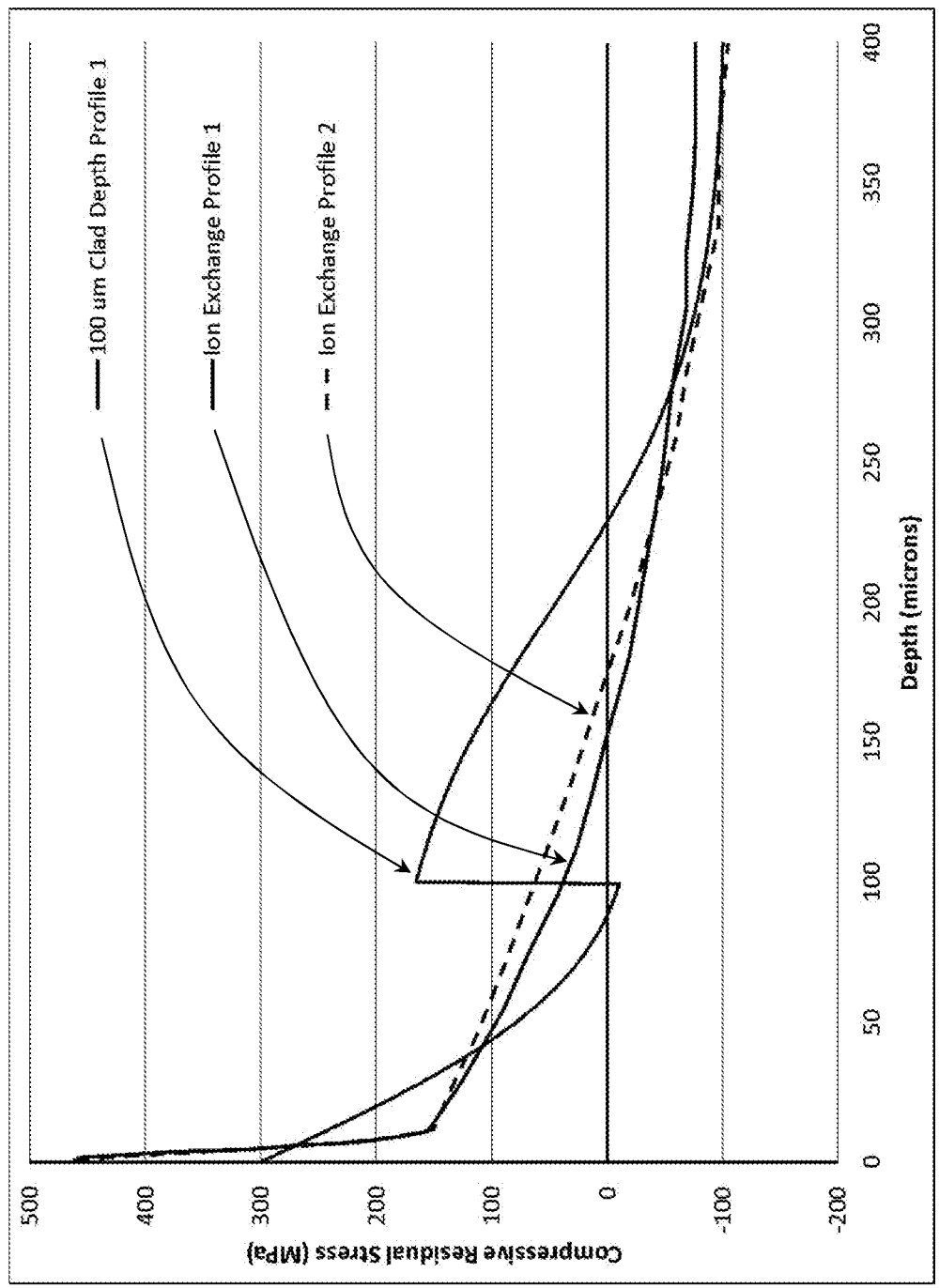
FIG. 8A illustrates a modelled stress profile of an uncoated, laminated glass-based article.
Figure 8B:
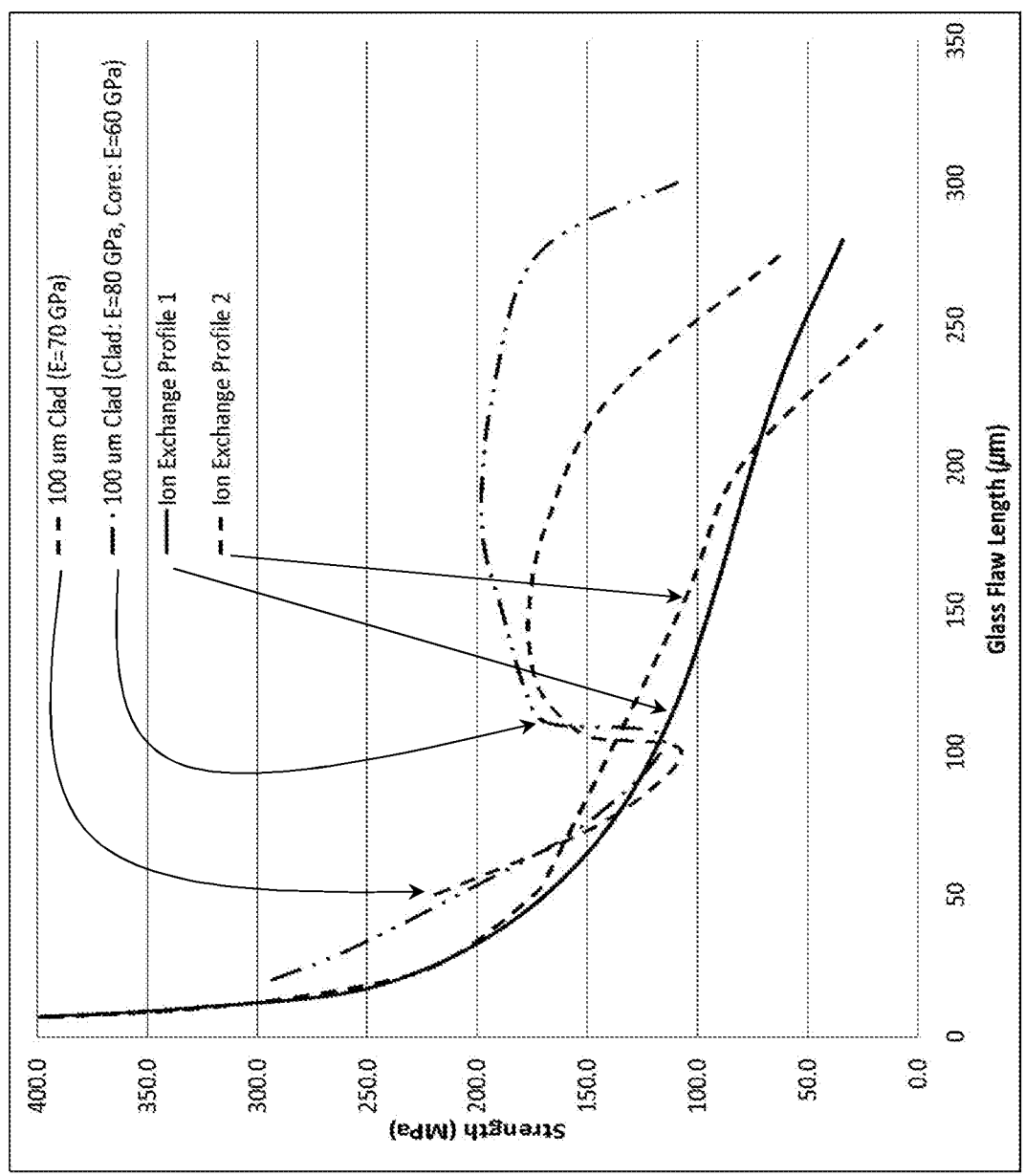
FIG. 8B illustrates a modelled strength versus flaw length plot for the stress profile in FIG. 8A.

FIG. 8A shows exemplary profile created with two 100 μm thick cladding substrates and a total thickness of 1.0 mm, comparing two possible ion exchange profiles. As shown in FIG. 8B, retained strength plots that demonstrate the effects of varying the core substrate and cladding substrate Young's moduli. In this exemplary case, the core substrate modulus was 60 GPa, while the cladding substrate modulus was 80 GPa. It was found that because of the modulus mismatch the retained strength was increased for flaws that terminated in the core when compared to the case for which both the core substrate and cladding substrate had Young's moduli of 70 GPa.

Figure 9A:
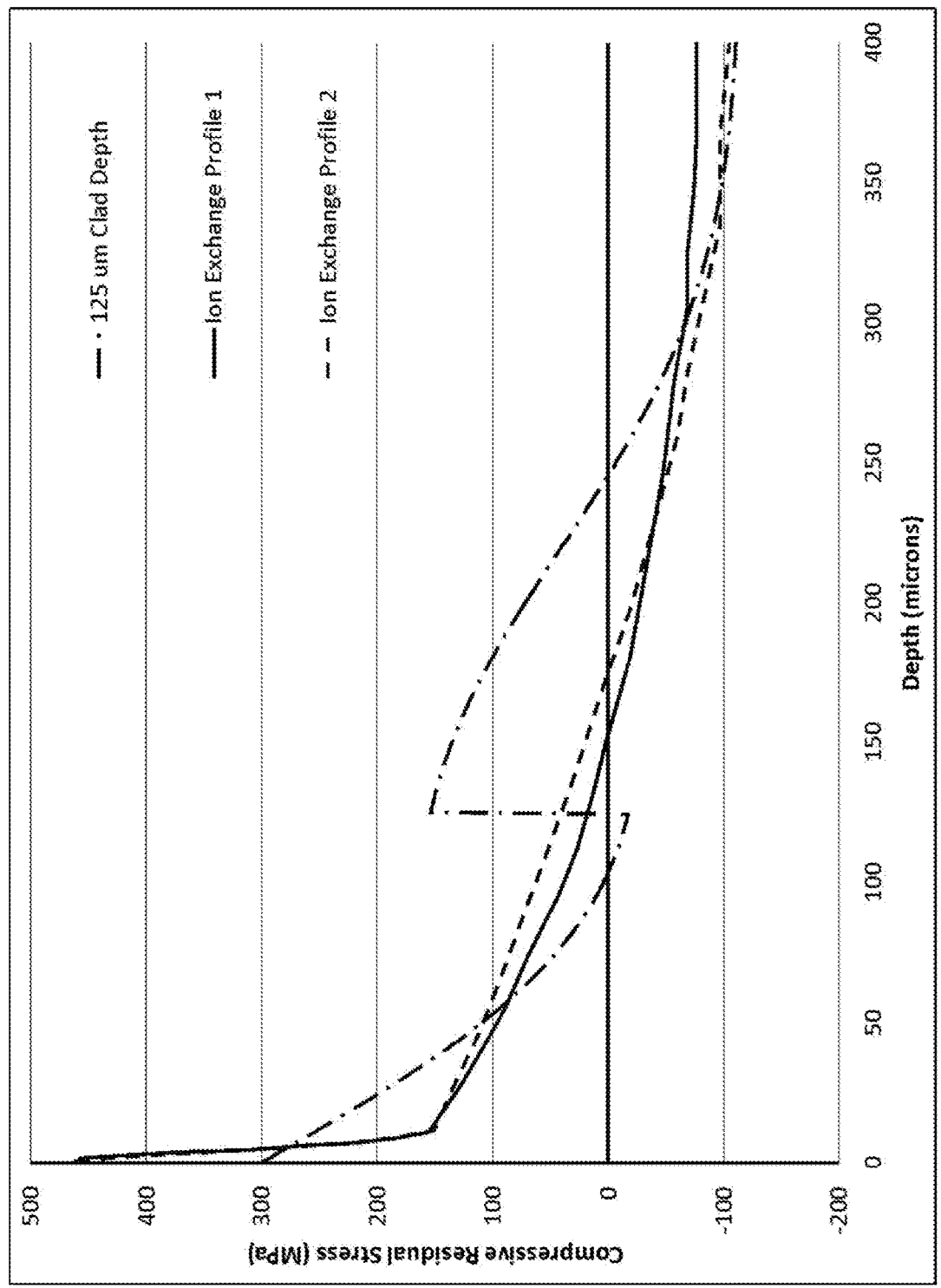
FIG. 9A illustrates a modelled stress profile of an uncoated, laminated glass-based article.
Figure 9B:
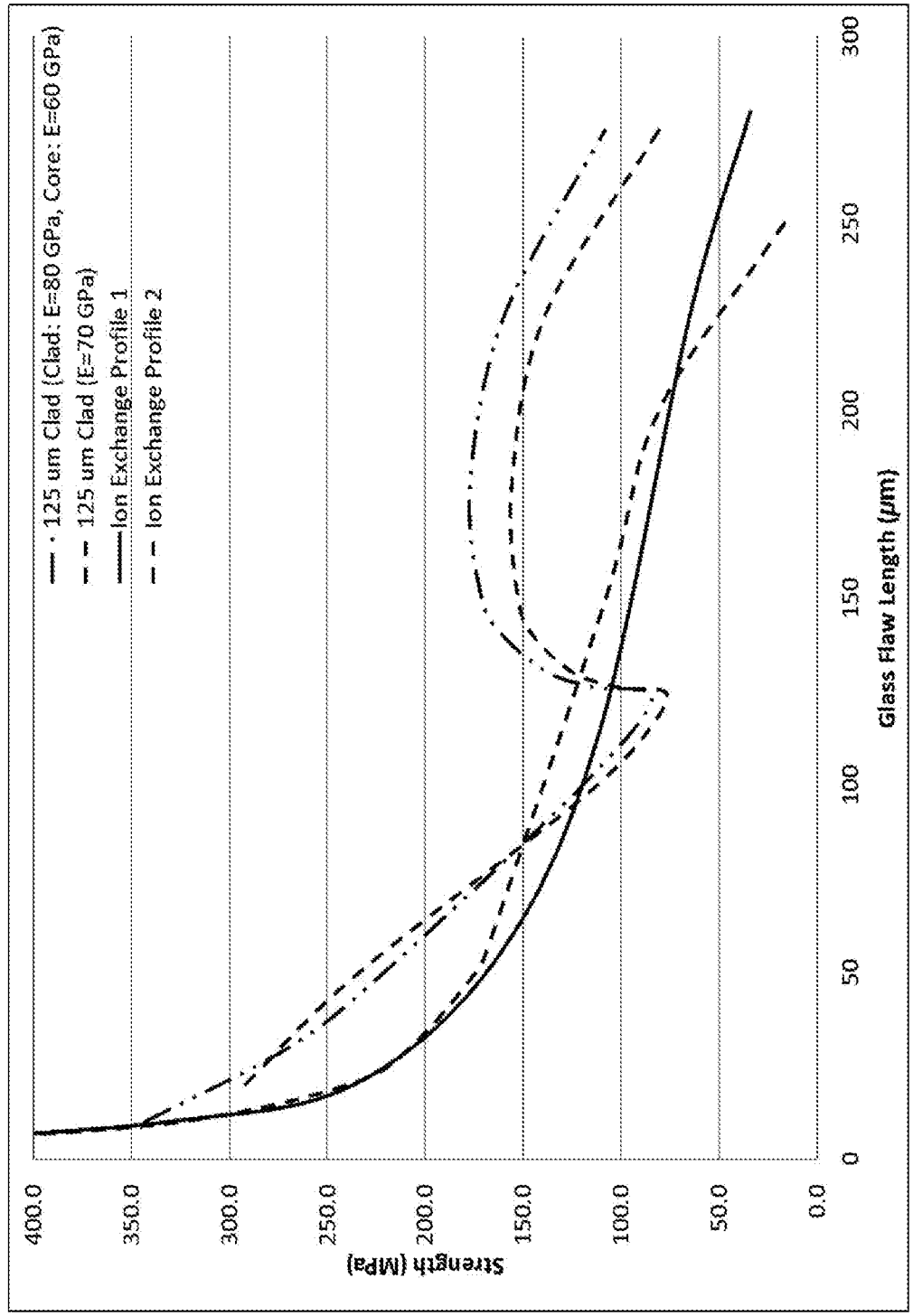
FIG. 9B illustrates a modelled strength versus flaw length plot for the stress profile in FIG. 9A.

In FIG. 9A, an exemplary profile created with two 125 μm thick cladding substrates and a total thickness of 1.0 mm compares two possible ion exchange profiles. As shown in FIG. 9B, the core substrate Young's modulus was 60 GPa, while the cladding substrate Young's modulus was 80 GPa. Because of the modulus mismatch the retained strength was increased for flaws that terminated in the core when compared to the case for which both the core and clad had moduli of 70 GPa. FIGS. 8-10 demonstrate that according to embodiments of the disclosure, an additional mechanism for increasing the damage resistance of a laminate glass article due to deep damage is provided, in addition to a way to tune and optimize stress profiles for the finished laminated glass articles.

The mobility of ions at the interfaces between the core substrate and cladding substrates is not accounted for in FIGS. 8-10. It is possible that ions in the core could possibly diffuse into the cladding, and vice versa. Several of the profiles in FIGS. 8-10 have a small amount of tension at the boundary of the cladding that can result in subcritical crack growth for at least some crack lengths. In addition, the tension resulted in a pronounced dip in the retained strength. Longer and deeper ion exchange of the cladding substrates will address each of these issues, as the longer and deeper ion exchanges will remove the tension.

Figure 10A:
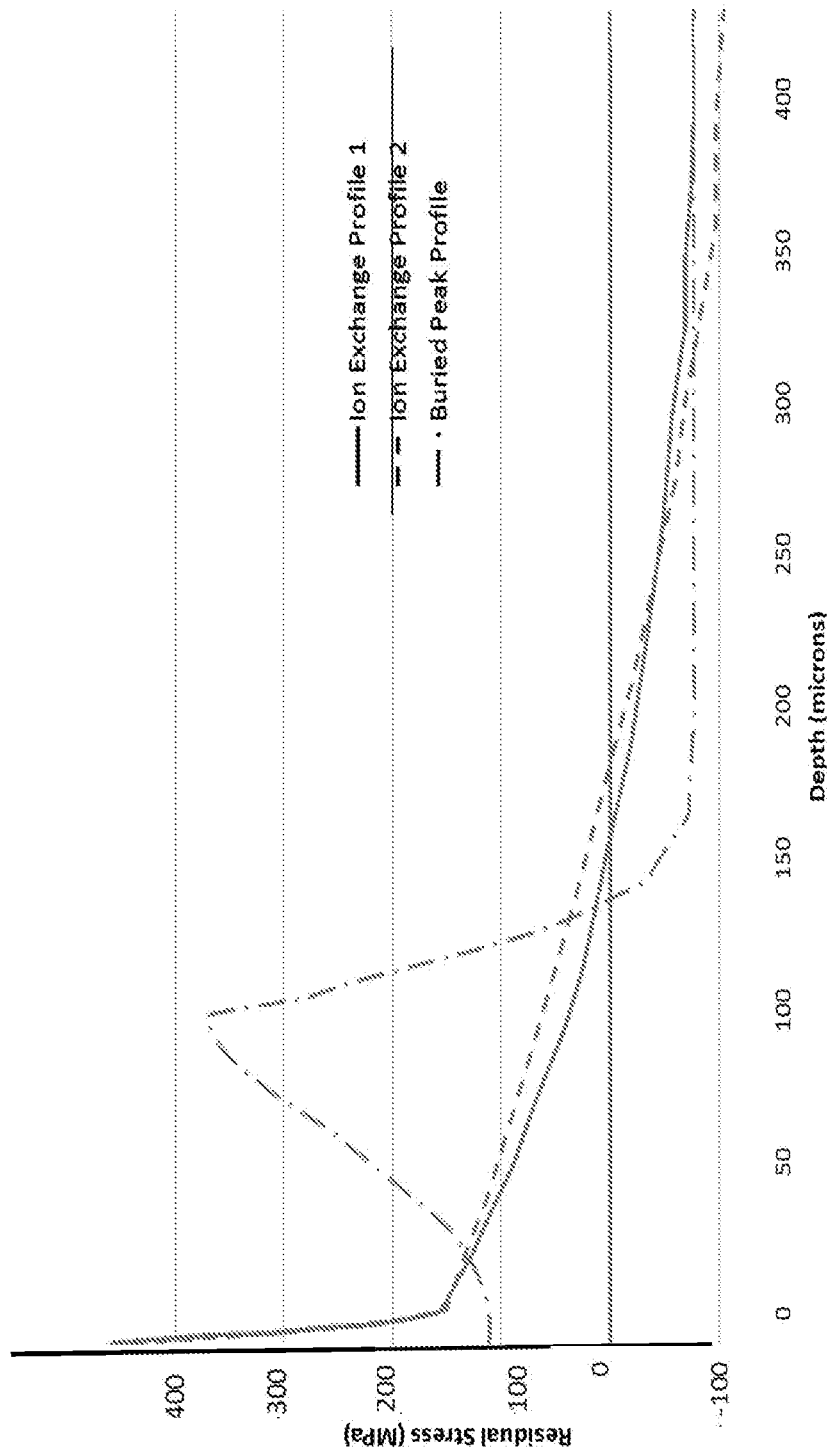
FIG. 10A illustrates a modelled stress profile of an uncoated, laminated glass-based article.
Figure 10B:
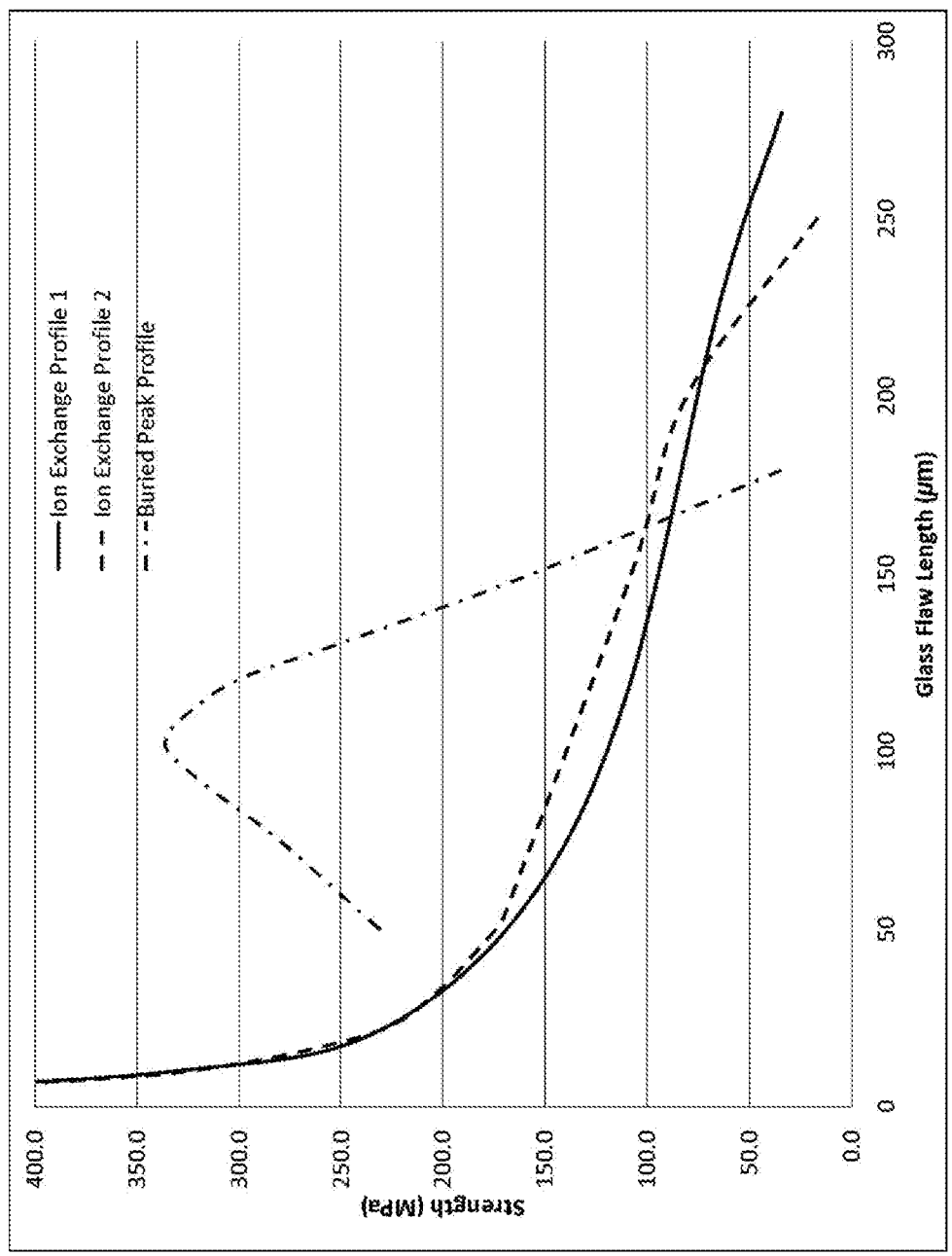
FIG. 10B illustrates a modelled strength versus flaw length plot for the stress profile in FIG. 10A.

In addition, by careful selection of core and clad composition as well as ion-exchange parameters, a profile like the one shown in FIG. 10A provides an example of a buried peak profile, for laminated glass-based article which has total thickness of 1.0 mm and two cladding substrates each having a thickness of 100 μm. The buried peak can be very deep, for example, greater than 25 μm, 30 μm, 35 μm, 40 μm, 45 μm, 50 μm, 60 μm, 70 μm, 80 μm, 90 μm, 100 μm, 125 μm, or 150 μm, unlike the buried peak profile created through dual ion exchanges of a single substrate. The retained strength plot is shown in FIG. 10B, and demonstrates similar results to the examples shown above. However, this plot also demonstrates a rising-R-curve behavior in which crack growth is associated with increasing strength for cracks smaller than 100 microns, which results in stable crack growth as well as a tighter reliability distribution of strength. Thus the lamination process provides a platform for creating such engineered stress profiles with unique characteristics. The buried peak profile has a strength advantage over the comparison profiles up to 175 μm, and the depth and magnitude of the difference can be adjusted to suit the application through the parameters of ion exchanges and clad thickness.

Figure 11:
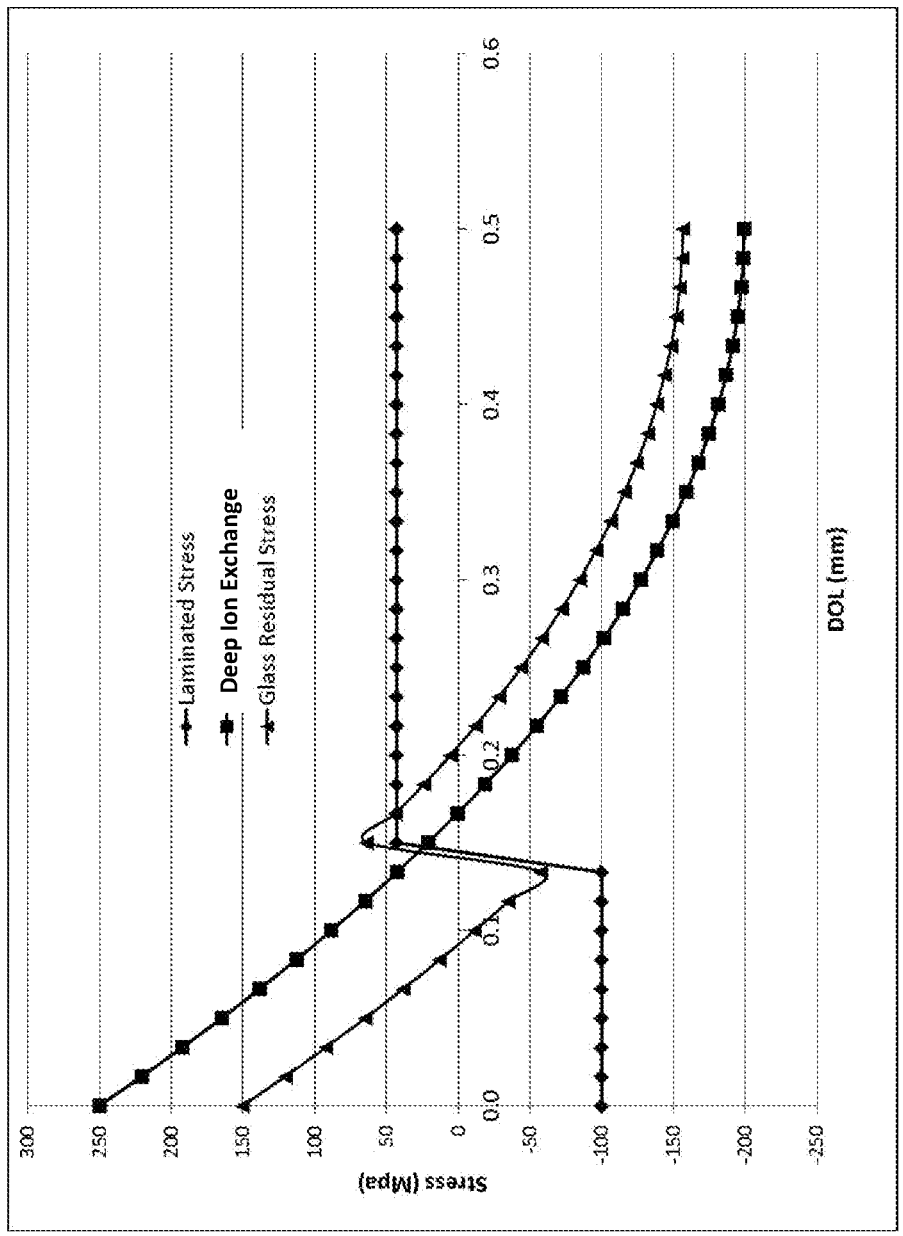
FIG. 11 illustrates a modelled stress profile of an uncoated, laminated glass-based article.

In addition, the process described herein to form laminated glass-based articles can be used to integrate sensors, or other features, into laminated glass-based articles, which is useful in the manufacture of cover glasses for electronic devices such as mobile phones and tablets. Sensors may benefit by being closer to the surface of the glass, but thinner cover glass can compromise the strength. Integrating the sensor into the cover glass can therefore serve the purpose of locating the sensor close to the glass surface without compromising the strength of the cover. In order to do so, the touch sensor is deposited on a glass substrate. Once the sensor is deposited onto the substrate, silica is deposited onto the surface of the sensor. Alternately, if the sensor material has sufficient silicon-oxygen bonds to create strong covalent bonds with the clad at bonding temperatures of 400° C. then the silica deposition step on the sensor will not be required. All of the components are then bonded together through the heating process of the laminate stack to form covalent bonds, as described herein, but with the sensor and clad being bonded to one side and only the clad bonded to the other. Such a process is beneficial when the sensor can survive temperatures of approximately 400° C. In addition to a sensor any other functional layers such as optical light guides and photochromatic layers can be protected in this way According to one or more embodiments, an alternative method (referred to as the CTE difference method) to make laminated glass-based articles includes a lamination process followed by a deep ion exchange process. In an embodiment, a laminated glass-based article is made using a laminated fusion process, as described in United States Patent Application Publication No. 20160114564A1. In such a process, a laminate fusion draw apparatus for forming a laminated glass article includes an upper isopipe which is positioned over a lower isopipe. The upper isopipe includes a trough into which a molten glass cladding composition is fed from a melter. Similarly, the lower isopipe includes a trough into which a molten glass core composition is fed from a melter. In the embodiments, described herein, the molten glass core composition has an average core coefficient of thermal expansion $CTE_{core}$ which is lower than the average cladding coefficient of thermal expansion $CTE_{clad}$ of the molten glass cladding composition For this laminated glass-based article, the CTE of the cladding is higher than that of the core, so that the clad is under tension after cooling down to room temperature. Then, the laminated glass-based article is ion exchanged. An example of profile created by such a process is illustrated in FIG. 11 for an uncoated glass-based article, which shows stress profiles of laminated glass and deep ion exchange. A laminated glass is prepared with stress profile of the diamond curve. The cladding is in tension and the core is in compression, which is opposite the conventional laminated glass. This lamination process is followed by a deep ion exchange process. The residual stress from this ion exchange process is the square curve. The final residual stress is the sum of the two stresses from lamination and ion exchange. For the lamination, the CTE of the cladding is higher than that of the core, so that the cladding is under tension after cooling down to room temperature.

In FIG. 11, the residual stress of the final product was assumed to be the sum of the lamination and ion exchange stresses. In this embodiment, the clad thickness is 0.12 mm, and the thickness of the laminated glass is 1.0 mm. The depth of the compressive layer is increased from around 166 um to over 200 um. This is more than 30 um increase and can improve retained strength of the material for deep flaws.

According to one or more embodiments, laminated glass-based articles as described herein can be used as thin cover glasses for mobile electronic devices such as mobile phones and tables. The stress profiles of a laminated glass-based article having a total thickness of 0.4 mm, with the cladding substrates being 65 um to 80 um in thickness, are plotted in FIG. 12 for an uncoated glass-based article. The solid curve is the residual stress from ion exchange (non-lamination), and the dashed curve is the final residual stress due to the linear summation of the lamination and ion exchange stresses. The depth of the compressive layer is increased roughly from 65 um to 80 um.

Figure 12:
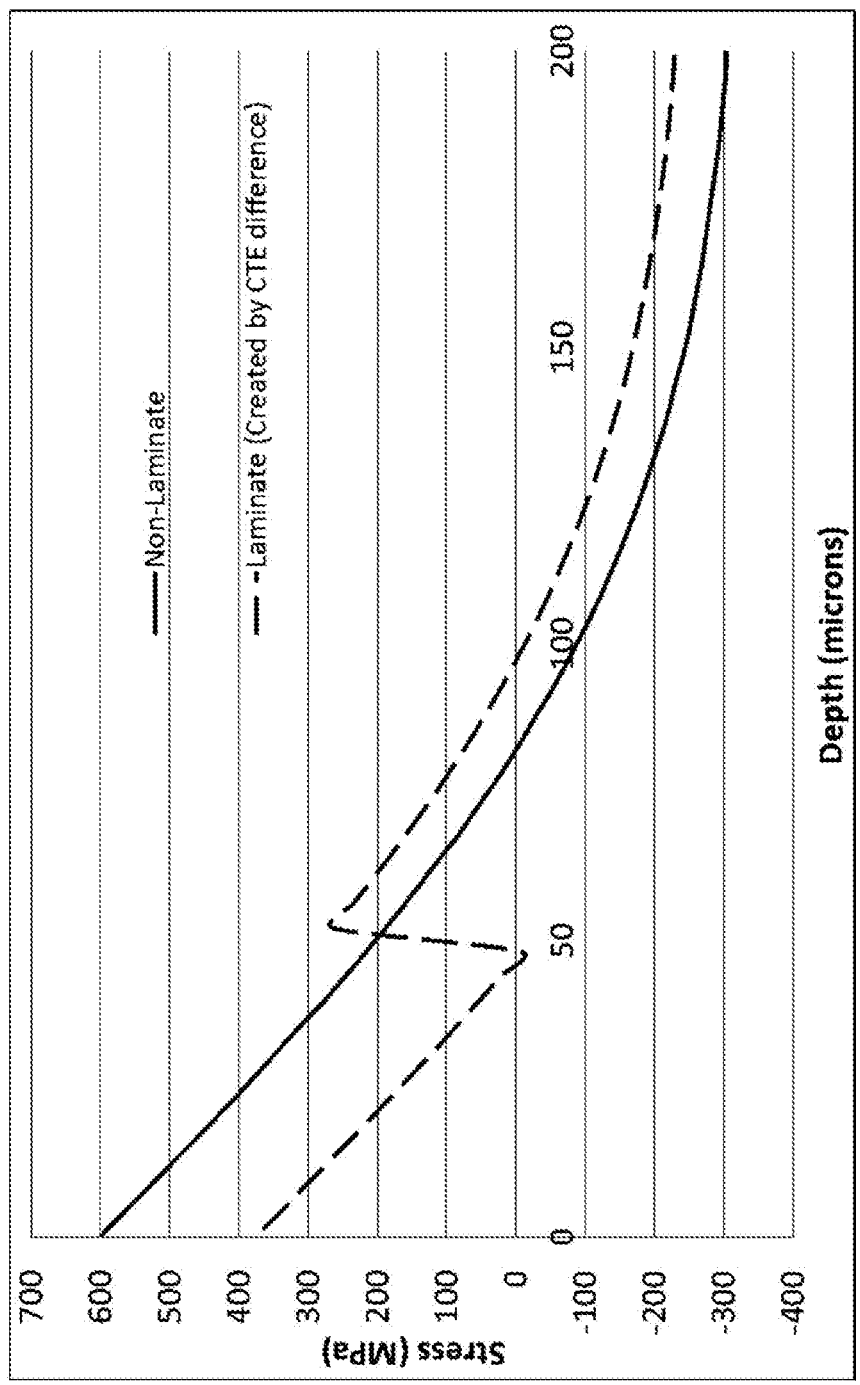
FIG. 12 illustrates a modelled stress profile of an uncoated, laminated glass-based article.
Figure 13:
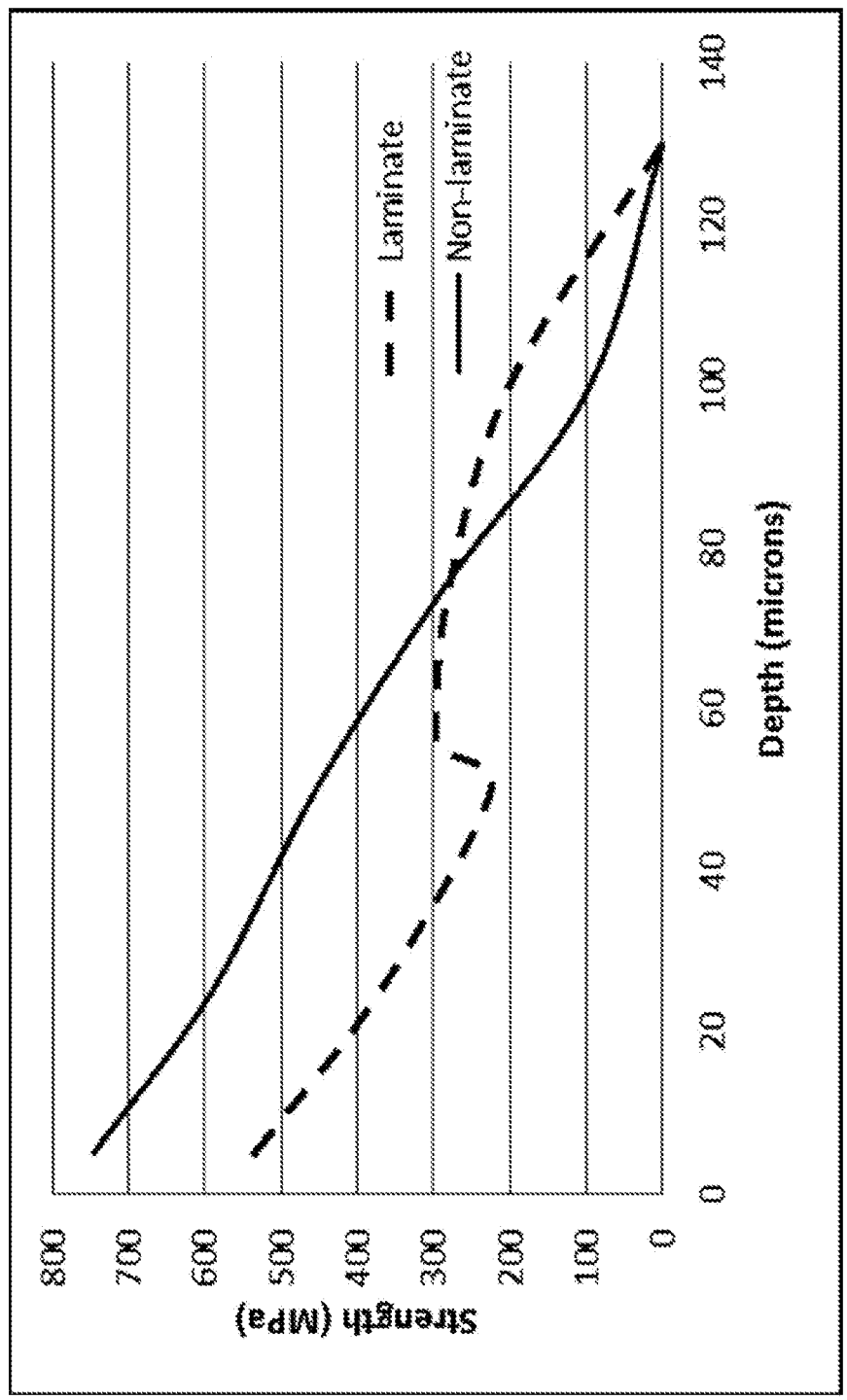
FIG. 13 illustrates a modelled strength versus depth profile of the laminated glass-based article profile in FIG. 12.

The retained strength of the stress profile of FIG. 12 is plotted in FIG. 13, which shows the non-monotonic retained strength with flaw size for the laminated sample. This is compared with the retained strength of the non-laminated glass shown by the solid line. In this case, the retained strength is larger when the flaw size is deeper than 80 um. It is beneficial when a deep flaw, for example 100 um, is introduced to the laminated cover glass in an undesired event, for example dropping onto a hard surface. It would take twice of a flexural stress, 200 MPa vs. 100 MPa, to break this glass. The central tension in the laminate case has decreased, meaning that some combination of compressive stress magnitude and depth of layer can be increased before the central tension matches the non-laminate case, which will improve the deep damage performance. Once this is done, the performance advantage of the laminate profile will further increase relative to the non-laminate profile.

Figure 14:
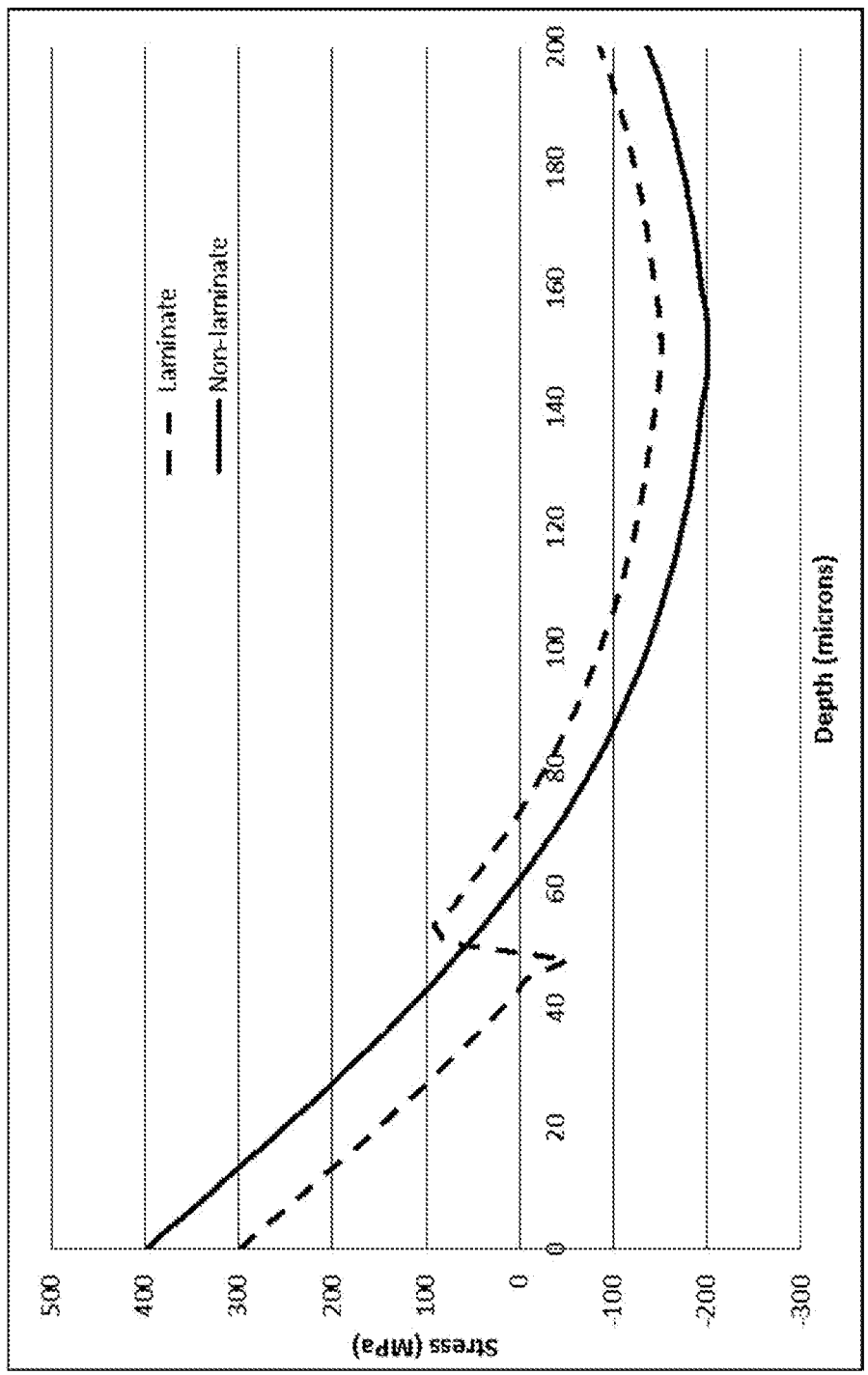
FIG. 14 illustrates a modelled stress profile of an uncoated laminated glass-based article.
Figure 15:
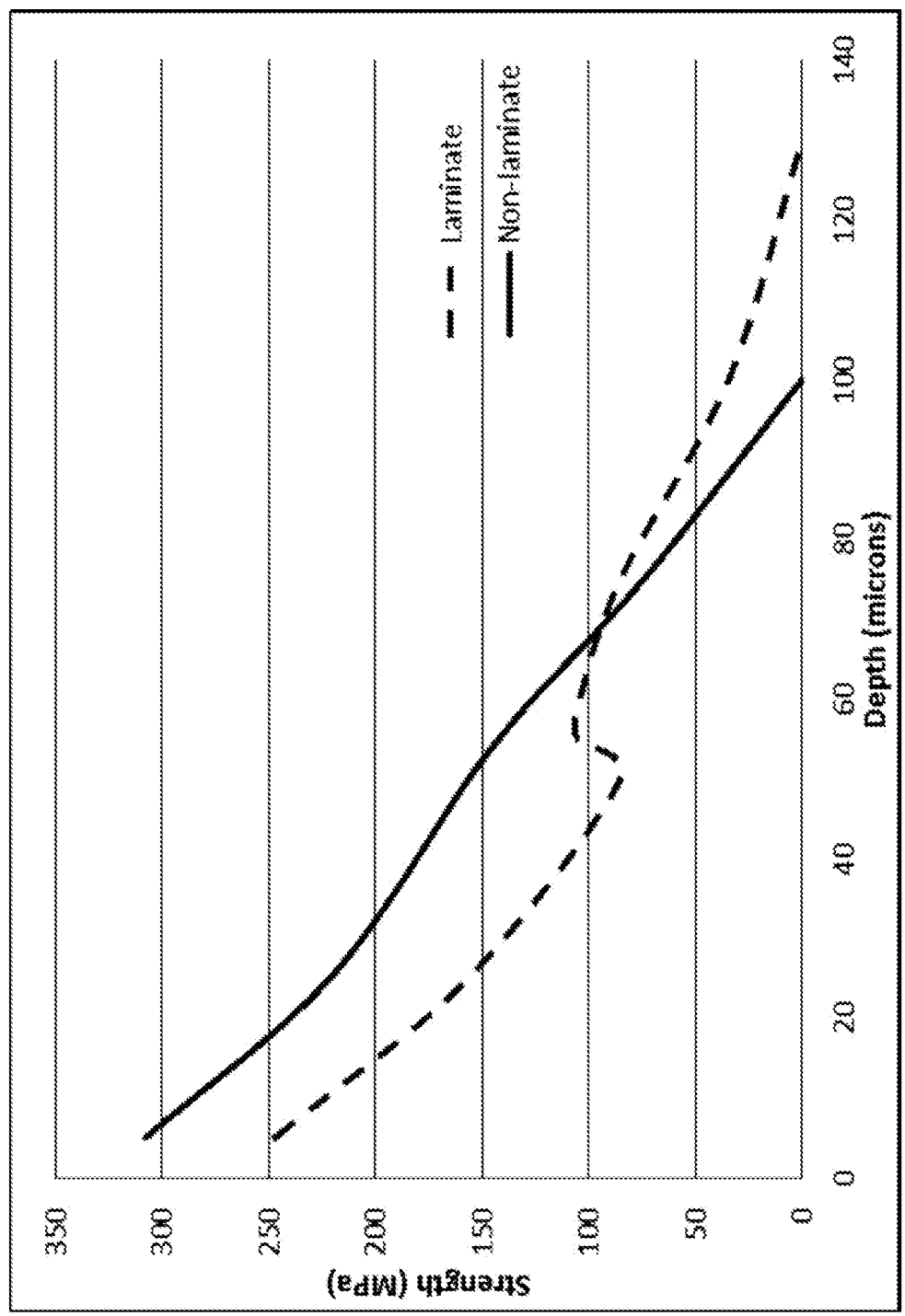
FIG. 15 illustrates a modelled strength versus depth profile of the laminated glass-based article profile in FIG. 14.

Another embodiment is illustrated in FIG. 14 and FIG. 15 for a thinner uncoated glass-based article having an overall thickness of 0.3 mm, with the cladding substrates being 50 μm thick. The benefits in depth of compressive layer and retained strength at deep flaws are similar to the 0.4 mm glass that has been discussed above. The depth of the compressive layer is increased roughly from 60 um to 75 um. There is a roughly 20% increase in depth of compressive layer, and better retained strength at deep flaws above 70 um. For a constant clad thickness and tension, the benefits of the proposed alternative method decrease as the core thickness increases because the energy balance dictates that the central compression is inversely proportional to the core thickness.

Figure 16A:
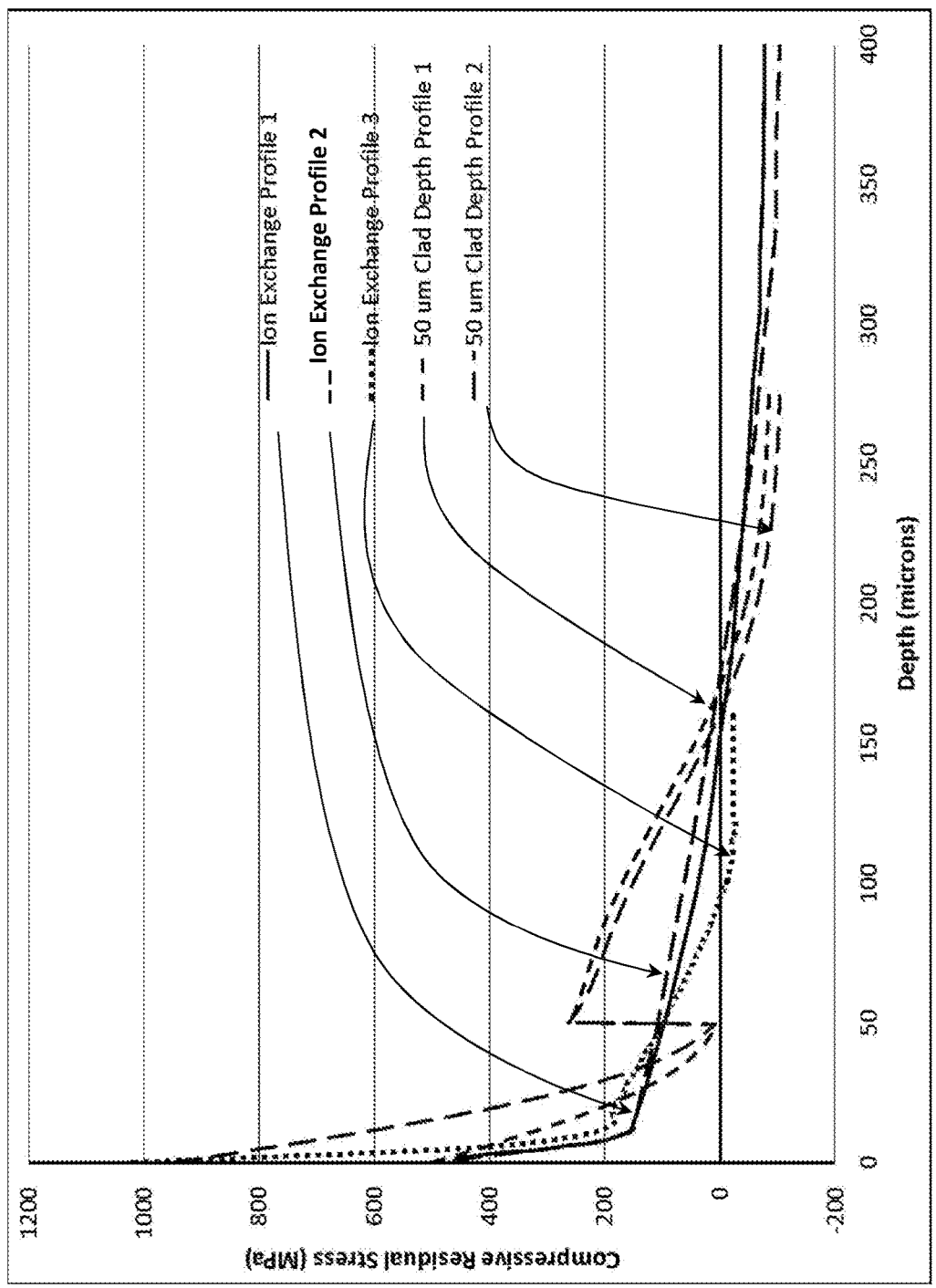
FIG. 16A illustrates a modelled stress profile of a coated, laminated glass-based article.
Figure 16B:
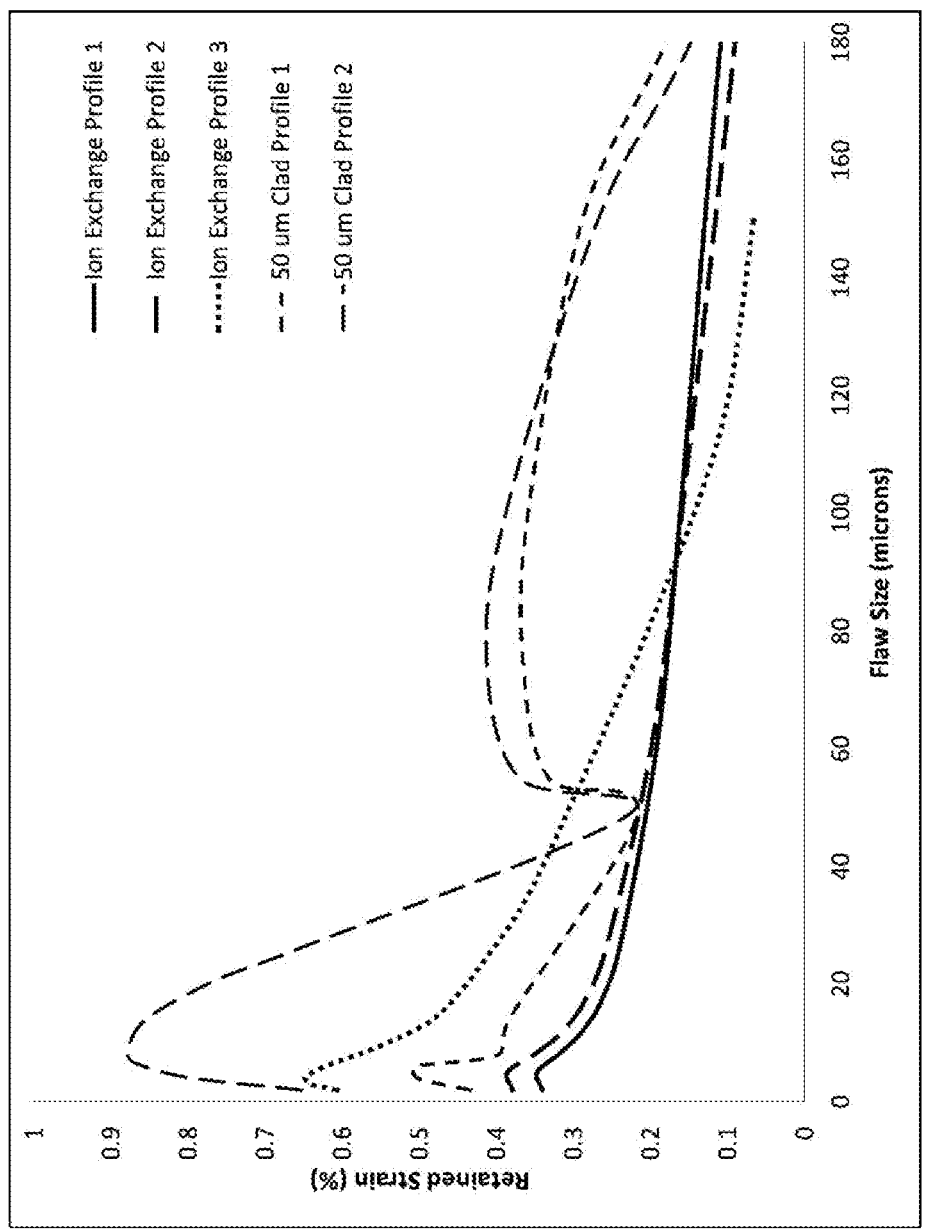
FIG. 16B illustrates a modelled strength versus flaw length plot for the stress profile in FIG. 16A.

FIG. 16A is a stress profile of a coated glass-based substrate in accordance with an embodiment of the disclosure. For comparison, three different potential ion exchange profiles are shown. Profile 3 (solid line) and profile 3 (dotted line) are comparative profiles. The benefit of applying a coating profile is evident from Profile 2 (dashed line), which shows that a high Young's modulus coating (greater than the Young's modulus of the cladding substrate) increases the compressive stress at the surface of the glass substrate. Comparing profile 3 to the uncoated profiles in FIG. 5B, it is evident that the higher Young's modulus coating provides an increase in CS at the surface of the glass article, resulting in a higher flexural strength. The cladding substrate profiles assume 1.0 mm substrates, while the standard ion exchange profiles assume 0.8 mm cladding substrate thickness. FIG. 16B shows retained strength plots for the stress profiles in FIG. 16A, demonstrating that profiles can be created that have both high flexural strength (high maximum critical strain) and deep flaw resistance for flaws between 50 and 180 μm. FIG. 16B shows that a sharp compressive stress needed at surface to arrest a crack from the coating, which improves flexural strength.

Figure 17A:
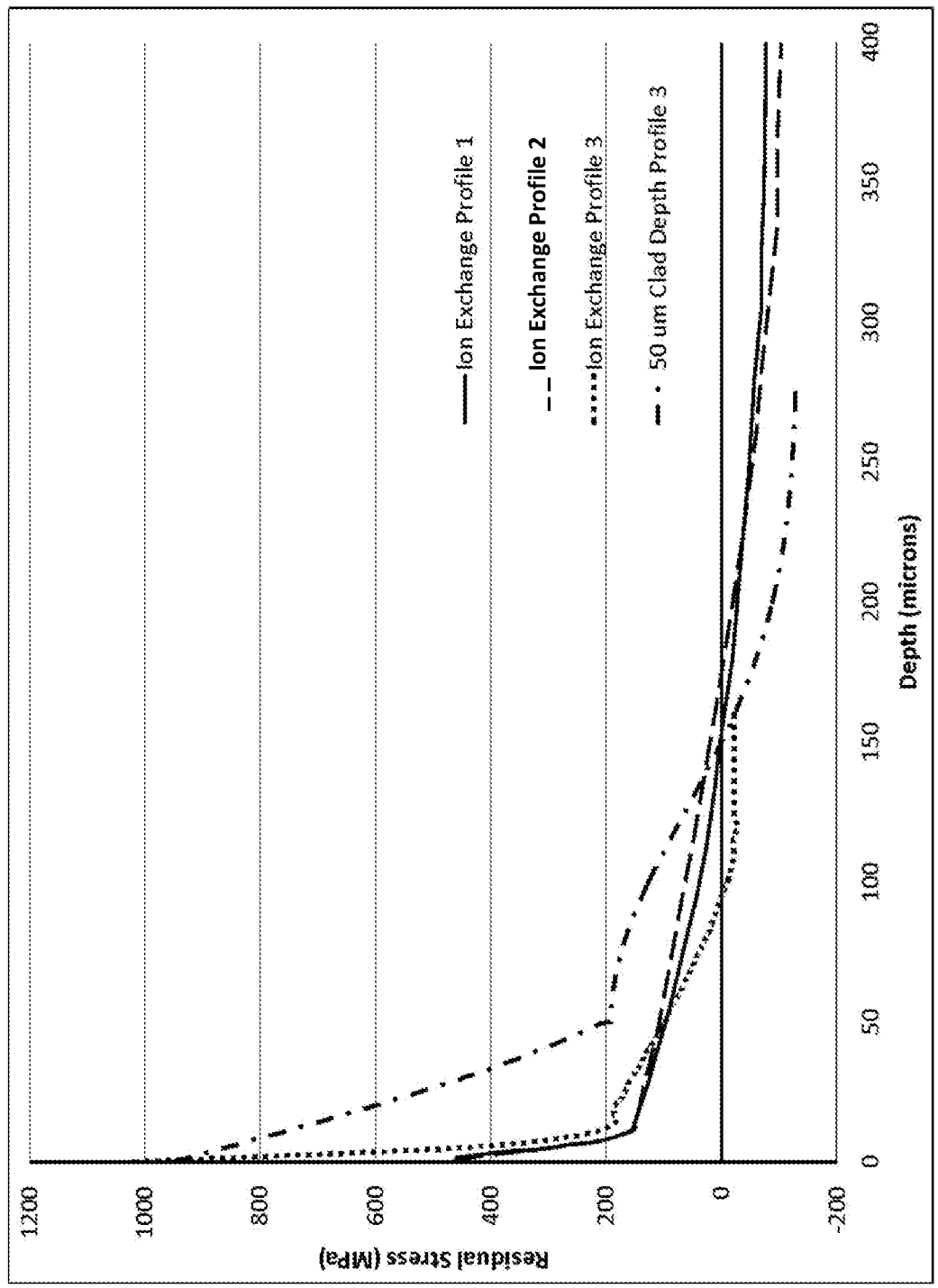
FIG. 17A illustrates a modelled stress profile of a coated, laminated glass-based article.
Figure 17B:
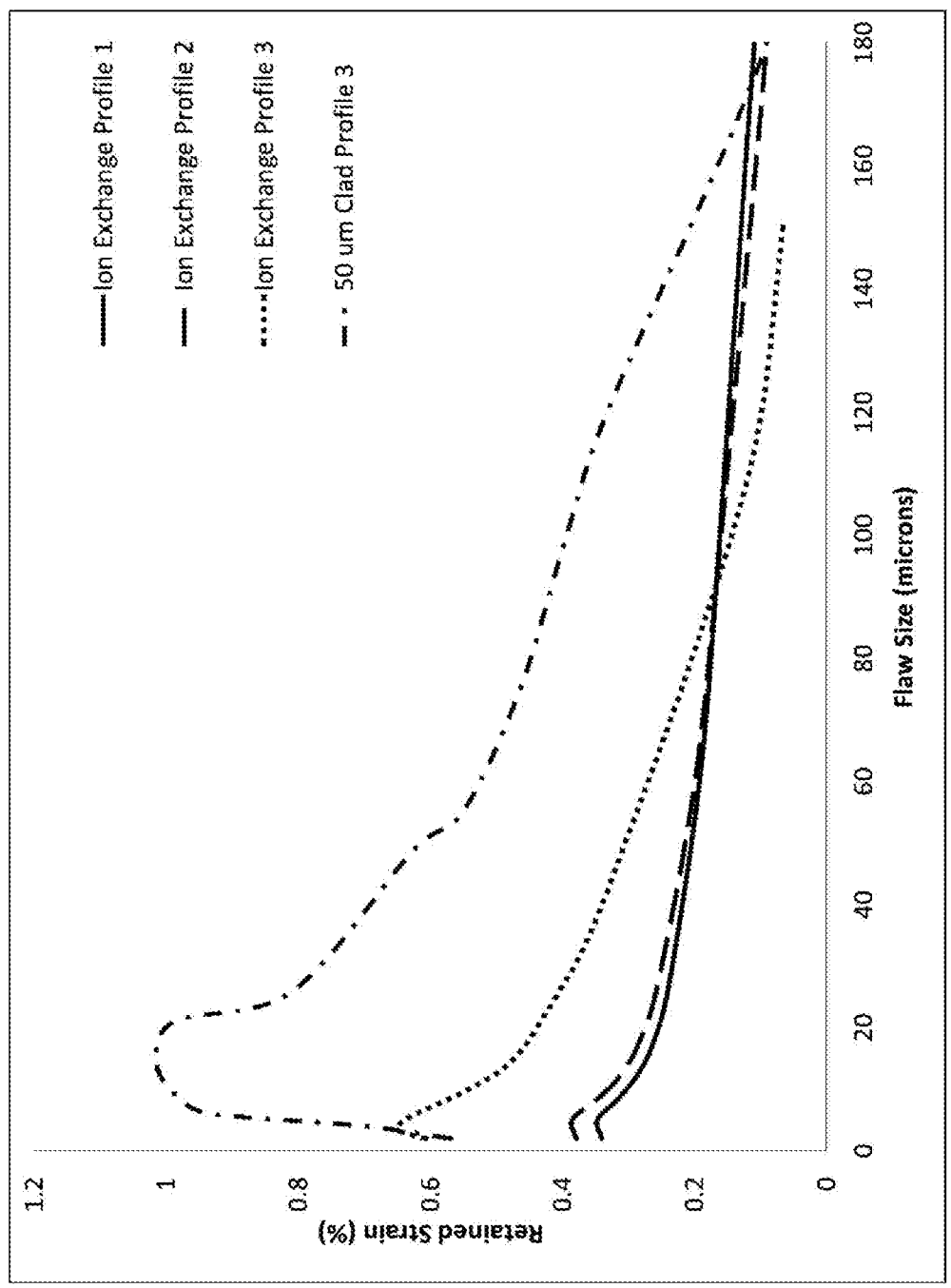
FIG. 17B illustrates a modelled strength versus flaw length plot for the stress profile in FIG. 17A.

In FIG. 17A, profile 1 and profile 2 are comparative profiles, and profile 3 represents the stress profile for a coated laminated glass-based article where thermal diffusivity of the clad is higher than the core. FIG. 17B shows the resulting retained strength for these profiles, which demonstrates a significant advantage for the profile 3 for flaws that are smaller than 180 μm compared to two possible, approximately parabolic, deep depths of compression (DOC) profiles. In FIGS. 17A-17B, the coating was assumed to be a single layer with a thickness of 2 μm and modulus of 225 GPa. Coated glass substrates have been known to fail by two different modes: damage introduction during rough surface drops, and flexural failure during smooth surface drops. For uncoated glass, flexural failure without damage introduction is rarely observed because of the very high strength retention for short flaws (less than 20 μm). However, because of strength reduction associated with glass after the application of hard coatings, device drops on smooth surfaces can be a critical failure mode. The flexural failure mode is controlled by the maximum critical strength (or strain), which can be seen in FIG. 17B. Maximum critical strain is a function of both the magnitude and distribution of the residual stress over the first 5 to 20 μm. Higher magnitude across the entire distribution is beneficial and not just peak magnitude. The 50 μm clad Profile 2 shown in FIGS. 17A and 17B have advantaged flexural strength, while the 50 μm clad Profile 1 is worse than the more conventional ion exchange profile because of the higher stress at the surface. According to embodiments of the disclosure, it is therefore possible to have flexural strength and deep damage resistance from the same profile.

According to one or more embodiments, the increase or decrease in strength on one side of a glass-based substrate can be determined using abraded ring on ring testing. The strength of a material is defined as the stress at which fracture occurs. The abraded ring on ring test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the abraded ring on ring test methodology described herein. The contents of ASTM C1499-09 are incorporated herein by reference in their entirety. In one embodiment, the glass specimen is abraded prior to ring-on-ring testing with 90 grit silicon carbide (SiC) particles that are delivered to the glass sample using the method and apparatus described in Annex A2, entitled "abrasion Procedures," of ASTM C158-02 (2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass-based article is abraded as described in ASTM C158-02, Annex 2, to normalize and/or control the surface defect condition of the sample using the apparatus shown in Figure A2.1 of ASTM C158-02. The abrasive material is typically sandblasted onto the surface 110 of the glass-based article at a load of 15 psi using an air pressure of 304 kPa (44 psi). After air flow is established, 5 cm³ of abrasive material is dumped into a funnel and the sample is sandblasted for 5 seconds after introduction of the abrasive material.

Figure 18:
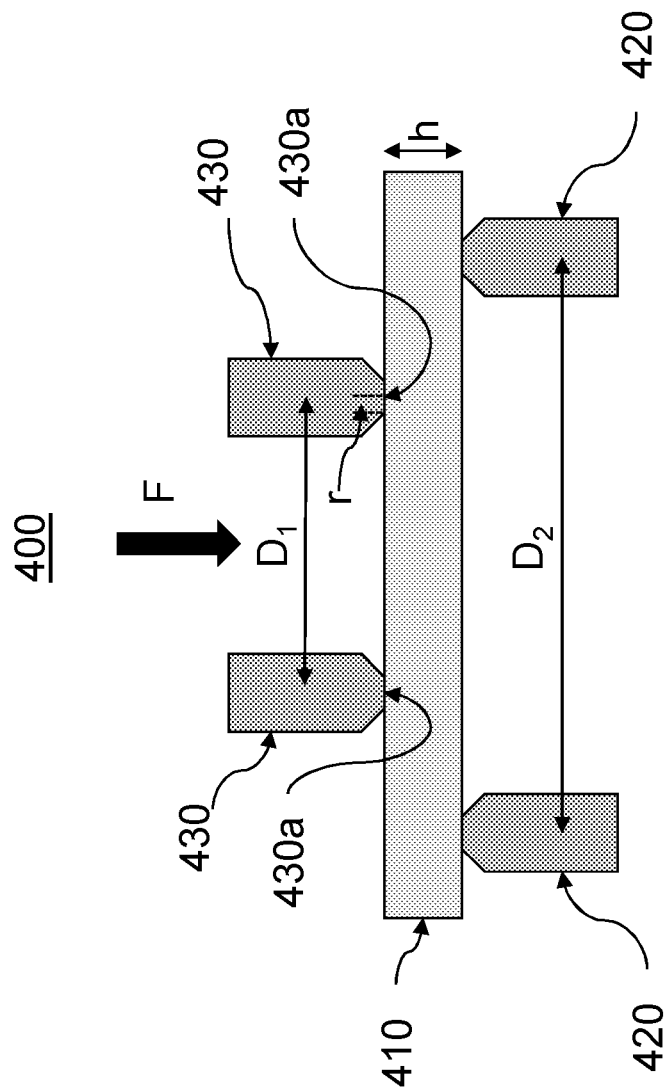
FIG. 18 illustrates a ring on ring testing setup for measuring strength of a substrate.

For the abraded ring on ring test, a glass-based article having at least one abraded surface 410 as shown in FIG. 18 is placed between two concentric rings of differing size to determine equibiaxial flexural strength (i.e., the maximum stress that a material is capable of sustaining when subjected to flexure between two concentric rings), as also shown in FIG. 18. In the abraded ring on ring configuration 400, the abraded glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from about 0.2 to about 0.5. In some embodiments, D1/D2 is about 0.5. Loading and support rings 130, 120 should be aligned concentrically to within 0.5% of support ring diameter D2. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, $h/2 \leq r \leq 3h/2$, where h is the thickness of glass-based article 410. Loading and support rings 430, 420 are typically made of hardened steel with hardness HRc>40. Abraded ring on ring fixtures are commercially available.

The intended failure mechanism for the abraded ring on ring test is to observe fracture of the glass-based article 410 originating from the surface 430a within the loading ring 430. Failures that occur outside of this region—i.e., between the loading rings 430 and support rings 420—are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. Abraded ring on ring testing therefore focuses on peak load at failure as the measured response.

The strength of glass-based article depends on the presence of surface flaws. However, the likelihood of a flaw of a given size being present cannot be precisely predicted, as the strength of glass is statistical in nature. A probability distribution can therefore generally be used as a statistical representation of the data obtained.

Glass-based articles described according to one or more embodiments can have a variety of end uses. In one or more embodiments, such glass-based articles include architectural glazings, automotive windshields and glazings. According to one or more embodiments, opposing surfaces of glass-based articles can be designed and tailored to have the desired strength and reliability. Similar considerations apply to architectural glazings used in building construction.

According to one or more embodiments, flaw sizes can be determined using fractography as follows. Flaw size can be determined using fractography by using ASTM Standard: C1322-15 (Standard Practice for Fractography and Characterization of Fracture Origins in Advanced Ceramics) to determine flaw sizes (origin sizes) for samples broken using four-point bend test (ASTM C1161: Standard Test Method for Flexural Strength of Advanced Ceramics at Ambient Temperature) or ring-on-ring test (ASTM C1499-15). This establishes the flaw size distribution for the glass sheet in the intended application. The more samples that are used for the destructive testing, the better the confidence in the flaw size distribution data from testing. Alternatively, according to one or more embodiments, flaw size can be determined using strength testing and fracture mechanics analysis. In an embodiment, strength data is obtained using as many samples as is feasible using a suitable strength test (four point bend for edge strength and ring-on-ring for interior strength). Using a suitable fracture analysis model (analytical or Finite element analysis), one can estimate the flaw size that must have caused failure of the sample in the strength test. This assumes a particular flaw size, shape, and location and hence the approach is not as accurate as the fractography approach but it is easier to establish flaw populations.

The strengthened glass-based substrates may be provided using a variety of different processes. For example, exemplary glass-based substrate forming methods include float glass processes and down-draw processes such as fusion draw and slot draw. A glass-based substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further and annealed to reduce internal stress.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

In some embodiments, the compositions used for the glass-based substrate may be batched with 0-2 mol % of at least one fining agent selected from a group that includes $Na_2SO_4$, NaCl, NaF, NaBr, $K_2SO_4$, KCl, KF, KBr, and $SnO_2$.

Once formed, a glass-based substrate may be strengthened to form a strengthened glass-based substrate to provide a strengthened substrate. It should be noted that glass ceramic substrates may also be strengthened in the same manner as glass-based substrates. As used herein, the term "strengthened substrate" may refer to a glass-based substrate or a glass substrates that has been chemically strengthened, for example through ion-exchange of larger ions for smaller ions in the surface of the glass-based or glass substrate. However, as discussed above, thermal strengthening methods known in the art, such as thermal tempering or heat strengthening, may be utilized to form strengthened glass substrates. In some embodiments, the substrates may be strengthened using a combination of chemical strengthening processes and thermally strengthening processes.

In strengthened glass-based substrates, there is a stress profile in which there is a compressive stress (CS) on the surface and tension (central tension, or CT) in the center of the glass. According to one or more embodiments, the glass can be thermally strengthened, chemically strengthened, or a combination of thermally strengthened and chemically strengthened. As used herein, "thermally strengthened" refers to substrates that are heat treated to improve the strength of the substrate, and "thermally strengthened" includes tempered substrates and heat-strengthened substrates, for example tempered glass and heat-strengthened glass. Tempered glass involves an accelerated cooling process, which creates higher surface compression and/or edge compression in the glass. Factors that impact the degree of surface compression include the air-quench temperature, volume, and other variables that create a surface compression of at least 10,000 pounds per square inch (psi). Tempered glass is typically four to five times stronger than annealed or untreated glass. Heat-strengthened glass is produced by a slower cooling than tempered glass, which results in a lower compression strength at the surface and heat-strengthened glass is approximately twice as strong as annealed, or untreated, glass.

Examples of glasses that may be used in the core and cladding substrates may include alkali aluminosilicate glass compositions or alkali aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. Suitable glass compositions, in some embodiments, further comprise at least one of $K_2O$, MgO, and CaO. In a particular embodiment, the glass compositions used in the substrates can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrates comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrates comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma$ modifiers$) > 1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma modifiers) > 1$.

In still another embodiment, the substrates may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO.

In an alternative embodiment, the substrates may comprise an alkali aluminosilicate glass composition comprising: 2 mol % or more of $Al_2O_3$ and/or $ZrO_2$, or 4 mol % or more of $Al_2O_3$ and/or $ZrO_2$.

The strengthened substrates described herein may be chemically strengthened by an ion exchange process. In the ion-exchange process, typically by immersion of a glass or glass ceramic substrate into a molten salt bath for a predetermined period of time, ions at or near the surface(s) of the glass or glass ceramic substrate are exchanged for larger metal ions from the salt bath. In one embodiment, the temperature of the molten salt bath is about 400-430° C. and the predetermined time period is about four to about twelve hours. The incorporation of the larger ions into the glass or glass ceramic substrate strengthens the substrate by creating a compressive stress in a near surface region or in regions at and adjacent to the surface(s) of the substrate. A corresponding tensile stress is induced within a central region or regions at a distance from the surface(s) of the substrate to balance the compressive stress. Glass or glass ceramic substrates utilizing this strengthening process may be described more specifically as chemically-strengthened or ion-exchanged glass or glass ceramic substrates.

In one example, sodium ions in a strengthened glass or glass ceramic substrate are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass ceramic can be replaced by Ag+ ions to provide an antimicrobial effect. Similarly, other alkali metal salts such as, but not limited to, sulfates, phosphates, halides, and the like may be used in the ion exchange process.

In strengthened glass-based substrates, there is a stress profile in which there is a compressive stress (CS) on the surface and tension (central tension, or CT) in the center of the glass. The replacement of smaller ions by larger ions at a temperature below that at which the glass network can relax produces a distribution of ions across the surface(s) of the strengthened substrate that results in a stress profile. The larger volume of the incoming ion produces a compressive stress (CS) on the surface and tension (central tension, or CT) in the center of the strengthened substrate. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. In one or more embodiments, the glass-based substrate used for the core and/or cladding can have a surface compressive stress of 750 MPa or greater, e.g., 800 MPa or greater, 850 MPa or greater, 900 MPa or greater, 950 MPa or greater, 1000 MPa or greater, 1150 MPa or greater, or 1200 MPa.

As used herein, DOC means the depth at which the stress in the chemically strengthened alkali aluminosilicate glass article described herein changes from compressive to tensile. DOC may be measured by FSM or or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Examples of glass compositions are provided above. In specific embodiments, glass compositions disclosed in U.S. Pat. No. 9,156,724 ("the '724 patent") may be used to form glass substrates. The '724 patent discloses alkali aluminosilicate glasses that are resistant to damage due to sharp impact and capable of fast ion exchange. Examples of such alkali aluminosilicate glasses comprise at least 4 mol % $P_2O_5$ and, when ion exchanged, have a Vickers crack initiation threshold of at least about 3 kgf, of at least about 4 kgf, of at least about 5 kgf, of at least about 6 kgf or of at least about 7 kgf. In one or more specific embodiments, the first strengthened substrate comprises an alkali aluminosilicate glass comprising at least about 4 mol % $P_2O_5$ and from 0 mol % to about 4 mol % $B_2O_3$, wherein the alkali aluminosilicate glass is $Li_2O$-free and wherein: $1.3<[P_2O_5+R_2O/M_2O_3]\leq2.3$; where $M_2O_3=Al_2O_3+B_2O_3$, and $R_2O$ is the sum of monovalent cation oxides present in the alkali aluminosilicate glass. In specific embodiments, such alkali aluminosilicate glasses comprise less than 1 mol % $K_2O$, for example 0 mol % $K_2O$. In specific embodiments, such alkali aluminosilicate glasses comprise less than 1 mol % $B_2O_3$, for example 0 mol % $B_2O_3$. In specific embodiments, such alkali aluminosilicate glasses are ion exchanged to a depth of layer of at least about 10 μm, and the alkali aluminosilicate glass has a compressive layer extending from a surface of the glass to the depth of layer, and wherein the compressive layer is under a compressive stress of at least about 300 MPa. In specific embodiments, such alkali aluminosilicate glasses include monovalent and divalent cation oxides are selected from the group consisting of $Na_2O$, $K_2O$, $Rb_2O$, $Cs_2O$, MgO, CaO, SrO, BaO, and ZnO. In highly specific embodiments, such alkali aluminosilicate glasses comprise from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. Glass substrates made from the glass composition described immediately above can be ion-exchanged to provide the profile described and claimed herein.

In one or more embodiments, glass compositions described in United States Patent Application Publication No. 20150239775 may be utilized to manufacture glass substrates that can be coated to provide coated glass-based articles as described herein. United States Patent Application Publication No. 20150239775 describes glass articles having a compressive stress profile including two linear portions: the first portion extending from the surface to a relatively shallow depth and having a steep slope; and a second portion extending from the shallow depth to the depth of compression.

Ion exchange processes are typically carried out by immersing a glass-based article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, and additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The compressive stress is created by chemically strengthening the glass-based article, for example, by the ion exchange processes previously described herein, in which a plurality of first metal ions in the outer region of the glass-based article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

Figure 19A:
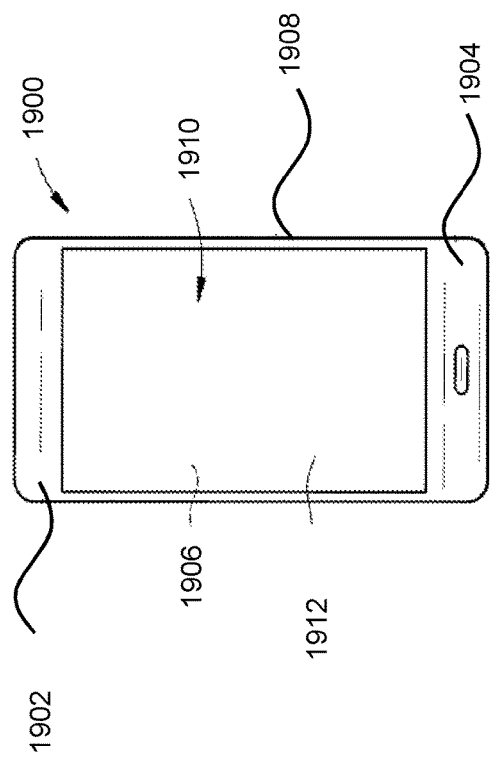
FIG. 19A is a plan view of an exemplary electronic device incorporating any of the coated-glass based articles disclosed herein.
Figure 19B:
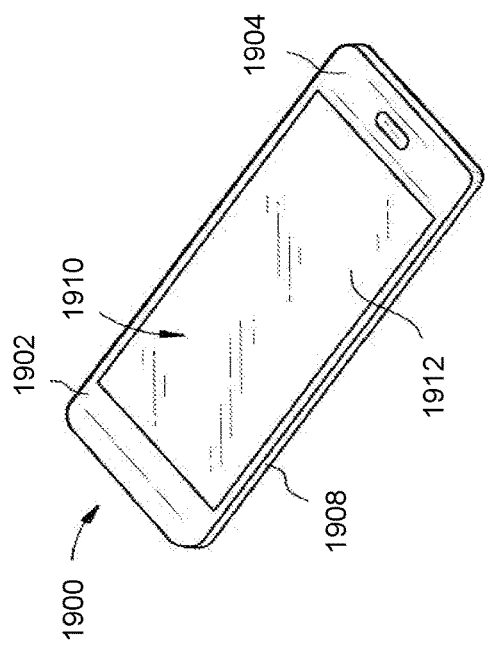
FIG. 19B is a perspective view of the exemplary electronic device of FIG. 19A.

The coated glass-based articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the coated glass-based articles disclosed herein is shown in FIGS. 19A and 19B. Specifically, FIGS. 19A and 19B show a consumer electronic device 1900 including a housing 1902 having front 1904, back 1906, and side surfaces 1908; electrical components (not shown) that are at least partially inside or entirely within the housing and including at least a controller, a memory, and a display 1910 at or adjacent to the front surface of the housing; and a cover substrate 1912 at or over the front surface of the housing such that it is over the display. In some embodiments, the cover substrate 1912 may include any of the coated glass-based articles disclosed herein.

While the foregoing is directed to various embodiments, other and further embodiments of the disclosure may be devised without departing from the basic scope thereof, and the scope thereof is determined by the claims that follow.

What is claimed is:

1. A coated glass-based article comprising:
   a glass-based substrate having a first surface and a second surface opposing the first surface defining a substrate thickness (t) in a range of about 0.1 millimeters to 3 millimeters, the glass-based substrate having a compressive region having a first compressive stress CS maximum at the first surface of the glass-based substrate extending to a depth of compression (DOC) and second local CS maximum at a depth of at least 25 $\lambda$m from the first surface, the glass-based article having a compressive stress versus depth from the first surface providing a stress profile including a first portion where all points comprise a steep tangent having an absolute value in a range of 10 MPa/micron and 20 MPa/micron and a second portion where all points comprise a shallow tangent, compared to the steep tangent, having an absolute value in a range of 0.5 MPa/micron and 2 MPa/micron, the glass-based substrate having a substrate Young's modulus value; and
   a coating on the second surface, the coating having a coating Young's modulus value greater than the substrate Young's modulus value.

2. The coated glass-based article of claim 1, wherein the glass-based substrate comprises a glass-based core substrate having a first side and a second side, the glass-based core substrate sandwiched between a glass-based first cladding substrate and a glass-based second cladding substrate, the first cladding substrate bonded to the first side and the second cladding substrate bonded to the second side by a covalent bond.

3. The coated glass-based article of claim 1, wherein the coating is a scratch resistant coating selected from $Al_2O_3$, AlN, $AlO_xN_y$, $Si_3N_4$, $SiO_xN_y$, $Si_uAl_v$, $O_xN_y$, diamond, diamond-like carbon, $Si_xC_y$, $Si_xO_yC_z$, $ZrO_2$, $TiO_xN_y$, and combinations thereof.

4. The coated glass-based article of claim 1, wherein the article has a compressive stress profile with a first maximum compressive stress at the first surface sufficient to provide flexural strength to prevent failure of the glass-based article from a flaw that originates in the coating.

5. The coated glass-based article of claim 4, wherein the first maximum compressive stress is in a range from 800 MPa to 1200 MPa.

6. The coated glass-based article of claim 1, wherein the coating comprises a coating thickness in a range from about 80 nanometers to 10 μm.

7. The coated glass-based article of claim 1, wherein the substrate Young's modulus value is in a range from 60 GPa to 80 GPa, and the coating Young's modulus value is in a range from 70 GPa to 400 GPa.

8. The coated glass-based article of claim 1, wherein the coating Young's modulus value is in a range from 100 GPa to 300 GPa.

9. A coated glass-based article according to claim 1 comprising:
   a strengthened glass-based core substrate having a first surface and a second surface;
   a chemically strengthened glass-based first cladding substrate having a third surface directly bonded to the first surface to provide a first core-cladding interface; and
   a chemically strengthened glass-based second cladding substrate having a fourth surface directly bonded to the second surface to provide a second core-cladding interface, the core substrate bonded to the first cladding substrate and the second cladding substrate without a polymer between the core substrate and the first cladding substrate and without a polymer between the core substrate and the second cladding substrate, the core substrate comprising a first glass composition and the first cladding substrate and second cladding substrate each comprising a second glass composition, the first glass composition being different from the second glass composition, wherein the first glass composition has a first Young's modulus value and the second glass composition has a second Young's modulus value, the glass-based article further comprising a first coating on the first cladding substrate the first coating comprising a material selected to have a first coating Young's modulus value, the first coating Young's modulus value being greater than the second Young's modulus value.

10. The coated glass-based article of claim 9, further comprising a second coating on the second cladding substrate, the second coating comprising a material selected to have a second coating Young's modulus value, the second coating Young's modulus value being greater than the second Young's modulus value.

11. The coated glass-based article of claim 9, wherein the strengthened core substrate is chemically strengthened and the first cladding substrate has a stress profile that is optimized to resist failure from deep flaws.

12. The coated glass-based article of claim 11, wherein the first cladding substrate has a fifth surface, the glass-based article having a compressive stress profile with a first maximum compressive stress at the fifth surface sufficient to provide flexural strength to prevent failure of the glass-based article from a flaw that originates in the first coating.

13. The coated glass-based article of claim 12, wherein the first coating is selected from the group consisting of silica, indium tin oxide, aluminum oxynitride, porous silica, a glass-ceramic or a ceramic.

14. A consumer electronic product, comprising:
  a housing having a front surface, a back surface and side surfaces;
  electrical components provided at least partially within the housing, the electrical components including at least a controller, a memory, and a display, the display being provided at or adjacent the front surface of the housing; and
  the coated glass-based article of claim 9.

15. A method of manufacturing a coated glass-based article according to claim 1 comprising:
  bonding a glass-based first cladding substrate to a first side of a strengthened glass-based core substrate, the first cladding substrate having a first cladding substrate Young's modulus value;
  covalently bonding a glass-based second cladding substrate to a second side of the strengthened glass-based core substrate;
  chemically strengthening the first cladding substrate and the second cladding substrate; and
  applying a coating having a coating Young's modulus value to the first cladding substrate, the coating Young's modulus value being greater than the first cladding substrate Young's modulus value.

* * * * *

UNITED STATES PATENT AND TRADEMARK OFFICE
CERTIFICATE OF CORRECTION

PATENT NO. : 11,254,607 B2
APPLICATION NO. : 16/478700
DATED : February 22, 2022
INVENTOR(S) : Jason Thomas Harris et al.

It is certified that error appears in the above-identified patent and that said Letters Patent is hereby corrected as shown below:

In the Claims

In Column 26, Line 14, in Claim 1, delete "$\lambda m$" and insert -- $\mu m$ --.

In Column 26, Line 38, in Claim 3, delete "$Si_uAl_v, O_xN_y,$" and insert -- $Si_uAl_vO_xN_y,$ --.

Signed and Sealed this
Twenty-first Day of June, 2022

Katherine Kelly Vidal
*Director of the United States Patent and Trademark Office*